United States Patent [19]

Klun et al.

[11] Patent Number: 5,109,097
[45] Date of Patent: Apr. 28, 1992

[54] RADIATION CURABLE COATING

[75] Inventors: Thomas P. Klun, Lakeland; David D. Lu, Arden Hills; Aida F. Robbins, Maplewood, all of Minn.

[73] Assignee: Minnesota Mining and Manufacturing Company, Saint Paul, Minn.

[21] Appl. No.: 578,476

[22] Filed: Sep. 7, 1990

[51] Int. Cl.$^5$ .................. C08B 15/06; B32B 27/16
[52] U.S. Cl. ................................. 528/75; 528/76; 528/110; 528/393; 428/425.1
[58] Field of Search ............... 528/75, 76, 110, 393; 427/54.1; 428/425.1

[56] References Cited

U.S. PATENT DOCUMENTS 4,358,477 11/1982 Noomen et al. .................... 528/75
4,855,184 8/1989 Klun et al. ...................... 428/425.1

Primary Examiner—John Kight, III
Assistant Examiner—Duc Troung
Attorney, Agent, or Firm—Gary L. Griswold; Walter N. Kirn; Gregory A. Evearitt

[57] ABSTRACT

Normally solid organic solvent-soluble thermoplastic, polyethylenically-unsaturated polyurethane polymers having pendent cardo (cyclic) groups are disclosed. These polymers can be coated to provide coatings that can be worked (sanded) and that under the influence of activating energy, polymerize to coatings which can have excellent solvent and abrasion resistance.

16 Claims, No Drawings

RADIATION CURABLE COATING

FIELD OF THE INVENTION

This invention relates to energy curable polyethylenically-unsaturated polyurethane polymers having a pendent cyclic group, to compositions containing the polymers and to substrates bearing a layer of the composition for protection, decoration of substrates and other uses.

BACKGROUND OF THE INVENTION

Protective coatings for wood and various other solid substrates are well known and a wide variety of coating compositions have been used in the past. Some protective coatings serve a number of different purposes such as providing abrasion and scratch resistance and protection against water spotting and solvent damage. Two important types of protective coatings are lacquer-type coatings and reactive-type coatings.

Lacquer-type coating compositions are provided as a solvent solution of solid thermoplastic resins, either naturally occurring resins, e.g., shellac, or synthetic resins, e.g., nitrocellulose. The lacquer-type coating is obtained by coating a substrate with the resin solution and allowing the solvent to evaporate. By using these lacquer-type coating compositions, coatings are obtained that can, in many cases, be sanded, buffed, and polished. The coating, even though it may be somewhat abrasion resistant, is still soluble in certain solvents and therefore, is readily damaged by solvent.

The reactive-type coating compositions are provided as one or more compounds, oligomers, or polymers which contain polymerizable or reactive functional groups such as ethylenic unsaturation, e.g., acrylate or methacrylate groups; epoxy; isocyanate; carboxylic acid; and hydroxyl groups, that can react to chain-extend and/or crosslink to form the protective coating. In some cases, the reaction can take days before the coating has achieved the desired hardness or degree of cure. Compositions containing polymerizable ethylenic unsaturation can be cured by heat or radiation, e.g., ultraviolet light or electron beam radiation. Such compositions cured by ultraviolet light require the presence of a photoinitiator, while those cured with electron beam radiation do not require a photoinitiator. Radiation cured coatings often take only seconds or minutes to cure to yield the final desired properties.

E. Levine in "Formulating Ultraviolet Curable Coatings" (*Modern Paint and Coatings*, vol. 73, no. 8, 1983, pp. 26–29) discloses radiation curable coatings which contain reactive oligomers, e.g., acrylated epoxies, urethanes, polyesters, and acrylics, multifunctional acrylate and methacrylate monomers, and monofunctional monomers. R. S. Biley in "UV Cured Coatings for Wood Furniture" (*Radiation Curing*, November 1983, pp. 14–17) mentions unsaturated polyesters and acrylics as UV curable coatings.

Included among prior art radiation curable coatings are the well known polyurethane polyacrylates such as those exemplified in U.S. Pat. No. 4,082,634, 4,097,439 4,233,130 and 4,295,947. Acrylated fatty compounds have also been reacted with polyisocyanates to provide polyurethanes having acrylic and fatty groups for use in radiation curable coatings such as are described in U.S. Pat. Nos. 4,224,369 and 4,233,130.

Polyurethane/urea resins containing pendent cyclic groups are known. For example, in U.S. Pat. No. 3,160,648, the preparation of 9,9-bis(3-isocyanatopropyl)fluorene and its reaction with diols and diamines to form polyurethane or polyurea resins respectively is described. And in U.S. Pat. No. 3,758,422, a polyurethane resin containing a pendent phenolphthalein derivative is described. This resin is prepared by the reaction of a diisocyanate with a phenolphthalein product that had been obtained by reaction of phenolphthalein with ammonia or an amine followed by reaction with a 1,2-epoxide. Also, U.S. Pat. Nos. 4,499,165 and U.S. Pat. No. 4,636,361, disclose mixtures that are more compatible with dyes of non-polymeric oligomers comprising organic nuclei, of which at least one is a multicyclic aromatic nucleus, joined by linking groups that can be an urethane group. In none of these patents is described polyurethane/urea resins having both pendent ethylenically-unsaturated groups and pendent cyclic groups.

Polyethylenically-unsaturated polymers having pendent cyclic groups are known. These polymers can be exemplified by U.S. Pat. No. 4,340,454 wherein it is taught that organic soluble polymers having a glass transition temperature (Tg) greater that 200° C. can be obtained by including in the polymer recurring high-temperature resistant units having a polycyclic structure. Ethylenically-unsaturated polyurethanes or polyureas are not disclosed.

Many polyethylenically-unsaturated polyurethane and polyurea resins are known and can be exemplified by, among many others, U.S. Pat. No. 4,097,439 where radiation curable coating compositions comprising ethylenically-unsaturated polyurethane resins that are the reaction product of polyester or polyether diols with diisocyanates followed by reaction with an ethylenically-unsaturated monoalcohol or monoamine are disclosed. Polymers having pendent cyclic groups are not disclosed.

In none of the patents discussed above or in any others of which applicants are aware are ethylenically-unsaturated polyurethanes or polyureas having pendent cyclic groups disclosed.

Coatings such as these radiation curable coatings are useful in providing various degrees of protection against solvents, stains and abrasions, but all suffer from one or more disadvantages. For example, some coatings prepared from blends of ethylenically unsaturated oligomers and monomers are wet or tacky after coating and thus are susceptible to the pickup of dust particles or foreign matter until crosslinked by radiation. Such coatings do not have a thermoplastic stage that can be sanded and polished. After crosslinking, imperfections which may be present in the insoluble, radiation cured, hard coatings are difficult to correct such as by sanding and buffing, and defects cannot be repaired by removal of the coating by solvents.

Although some of these coatings can be physically worked for various purposes which are conventional to the lacquer art and which can thereafter be exposed to radiation to cure the film to increase the solvent resistance and physical toughness of the film and thereby product a more durable film, there is a need for coatings that provide still better characteristics. Furthermore, the coating compositions may require the use of ethylenically unsaturated isocyanates or low molecular weight ethylenically unsaturated monomers that can cause toxicological problems.

Other deficiencies in many known protective coatings are darkness of coating color and/or lack of clarity, because the coatings include components which are colored or develop color on curing, or are incompatible, i.e., not mutually soluble, with each other.

SUMMARY OF THE INVENTION

Briefly, the present invention provides normally solid, organic solvent-soluble, thermoplastic, polyethylenically-unsaturated polyurethane polymers having pendent cyclic groups.

The present invention also provides a method for providing a substrate, such as wood, e.g., furniture and paneling, with a protective coating comprising applying to a substrate an organic solvent solution of a thermoplastic polyethylenically-unsaturated, polyurethane polymer having pendent cyclic groups; drying the coating composition to remove solvent; and crosslinking the dried coating with heat or actinic radiation, e.g., ultraviolet, radiation, or ionizing radiation. The dried coating can be tack-free and may optionally be physically worked, sanded or polished, e.g., to smooth or repair an inadvertently damaged, dried coating, prior to crosslinking.

The present invention further provides substrates, such as wood, e.g., furniture and paneling that are coated with a cured pendent cyclic group containing polyurethane polymer coating which is solvent resistant, abrasion resistant, heat resistant, and stain resistant.

The present invention still further provides shaped articles such as molded or extruded articles prepared from the above-described polyethylenically-unsaturated pendent cyclic group-containing polyurethane polymers and a method for preparing such shaped articles.

In the present application, the term "cardo" will be used to describe the "pendent cyclic group". To provide the required pendent cyclic groups in the polyurethane/urea resins of the invention, there are used compounds that have been used to provide polymers that in the art are called cardo polymers. The term "cardo" is explained in a review article by V. V. Korchak, et. al. J. Macromol. Sci. - Rev. Macromol Chem., C11(1), 45-142 (1974).

DETAILED DESCRIPTION OF THE INVENTION

Cardo compounds that can be used in the polyethylenically-unsaturated polyurethane polymers of the invention are diols, diamines, dithiols, and diisocyanates that have one or more alicyclic and/or aryl radicals that are pendent to, but not included in, a chain of atoms connecting the hydroxy, amino, thiol, and isocyanate groups respectively. Thus a simple cardo compound would be 1-phenyl- 1,2-ethanediol, however, 1,4-benzenedimethanol would not be classified as a cardo compound according to this invention.

The normally solid, organic solvent-soluble thermoplastic, polyethylenically-unsaturated, cardo polyurethane polymers can be obtained by the polymerization of a reaction mixture comprising (a) an aliphatic or cycloaliphatic diol comprising sufficient ethylenically-unsaturated diol to permit crosslinking of the polymerization product to a solvent-insoluble state; and (b) an organic diisocyanate, with the proviso that at least one percent of the components (a), and/or (b) are substituted by a cardo group.

The ethylenically-unsaturated diol is preferably present in an amount of at least about 5 weight percent of said aliphatic of cycloaliphatic and is preferably a polyethylenically unsaturated diol. The diols are aliphatic or cycloaliphatic diols which may contain an aromatic group, such as bis-1,4-(hydroxyethyl)benzene, i.e., that portion of the diol adjacent to the hydroxyl group must be aliphatic or cycloaliphatic.

A portion of the diol, generally about 0 to 95 weight percent, can be long-chain aliphatic group-modified diol. Optionally, some of the diol of component (a) of the reaction mixture can be replaced by a primary or secondary aromatic diamine, an aliphatic or cycloaliphatic diamine and/or an aliphatic or cycloaliphatic dithiol. The amount of diamine and/or dithiol is preferably sufficiently low that an organic solvent solution of the reaction product does not gel. Generally, up to about 95 weight percent of the diol can be replaced by a primary or secondary aromatic diamine. Up to about 60 weight percent of the diol can be replaced by an aliphatic or cycloaliphatic diamine having a molecular weight above about 1000. Generally, up to about 40 weight percent of the diol can be replaced by an aliphatic or cycloaliphatic diamine having a molecular weight of about 300 to 1000 and up to about 20 weight percent of the diol can be replaced by an aliphatic or cycloaliphatic diamine having a molecular weight of less than about 300. Generally, up to about 50 weight percent of the diol can be replaced by an aliphatic or cycloaliphatic dithiol. When both dithiols and aliphatic diamines are substituted for a portion of the diol, the amounts of dithiol and diamine must be proportionately reduced as can be appreciated by those skilled in the art. Generally, the total amount of combined dithiol and aliphatic diamine can replace no more than 60 weight percent of the diol.

The normally solid, organic solvent-soluble thermoplastic, polyethylenically-unsaturated cardo polyurethane polymers, preferably have the following structural formula

wherein
each $R^d$ is independently one or more divalent organic groups selected from divalent groups that are the residues provided by the removal of two of hydroxyl, thiol, and amino groups from aliphatic, and cycloaliphatic diols and dithiols and aliphatic, cycloaliphatic and aromatic diamines having a molecular weight of up to about 100,000 or more;
each $R^i$ is independently one or more divalent organic groups that are the residue provided by removal of two NCO groups from an organic diisocyanate;
each X is independently —O—, —S—, or —NR— wherein R is hydrogen or lower alkyl having 1 to 6 carbon atoms; and
a is a number having a value such that the polyurethane will form a continuous film; with the provisos that $R^d$ is derived from a sufficient amount of the ethylenically-unsaturated diol such that the polymer can be crosslinked to an organic solvent-insoluble state and that at least one weight percent of the combined $R^d$ and $R^i$ groups have pendent cardo groups.

Hereinafter, the diols, dithiols and diamine will be termed $R^d$ precursors and the diisocyanates will be termed $R^i$ precursors.

Preferably, at least about 5 weight percent of the $R^d$ precursors are ethylenically-unsaturated diols. Preferably, no more than 95 weight percent of the precursor is an aromatic diamine. Preferably, no more than 60 weight percent of the precursor is an aliphatic or cycloaliphatic diamine precursor having a molecular weight above 1000. Preferably, no more than 40 weight percent of the precursor is an aliphatic or cycloaliphatic diamine precursor having a molecular weight of 300 and 1000. Preferably, no more than 20 weight percent of the precursor is an aliphatic or cycloaliphatic diamine precursor having a molecular weight below 300.

Preferably, no more than 50 weight percent of the $R^d$ precursors are aliphatic or cycloaliphatic dithiols and the total amount of the diamine and dithiol precursors is less than about 60 weight percent.

Representative of non cardo group-containing $R^d$ groups are as follows:

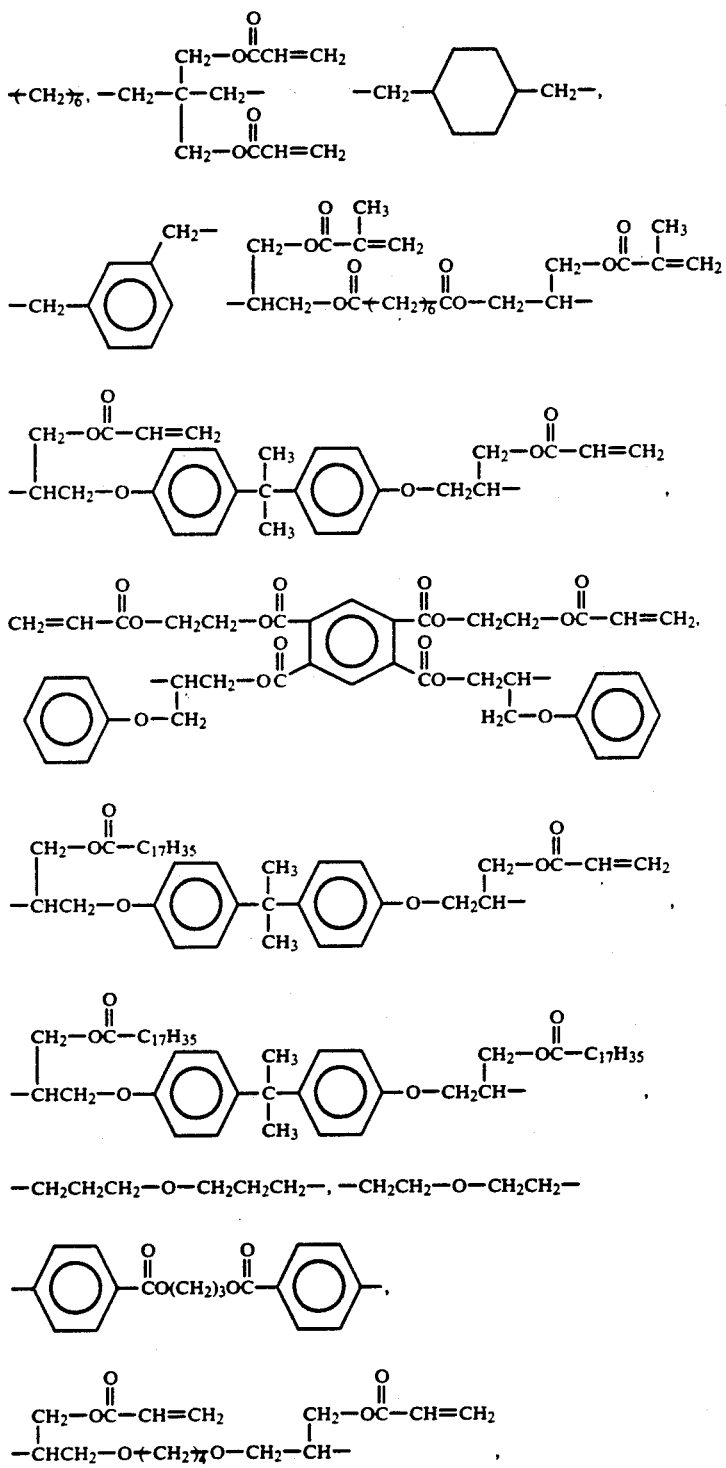

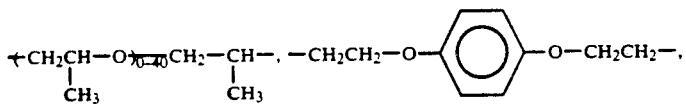

The organic diols that are useful in preparing the thermoplastic polyethylenically unsaturated cardo polyurethanes of the present invention are any organic compound having two primary or secondary hydroxyl groups. One or more diols can be used. At least 5 weight percent of the diols are ethylenically unsaturated diols. The organic diols are aliphatic cycloaliphatic diols which can contain an aromatic group such 1,4-bis(2-hydroxyethyl)benzene. The organic diols can be monomeric aliphatic diols having 2 to about 30 carbon atoms and may contain up to about 14 ether oxygen atoms and amide nitrogen atoms or the organic diols can be polymeric having a molecular weight as great as 100,000 or more.

Useful organic diols include, for example, poly(oxyalkylene)diols such as poly(oxyethylene)diol, poly(oxypropylene)diol, and poly(oxytetramethylene)diol; polyester diols such as poly(ethylene adipate)diol; poly(caprolactone)diols; and poly(carbonate)diols.

Preferably the ethylenically unsaturated diols have an ethylenic unsaturation equivalent weight of less than about 1000. A preferred class of ethylenically-unsaturated diols is the reaction product of an ethylenically-unsaturated acid, alcohol, or phenol with a polyepoxide, particularly a diepoxide. Such a reaction can be represented by the following reaction scheme:

SCHEME A

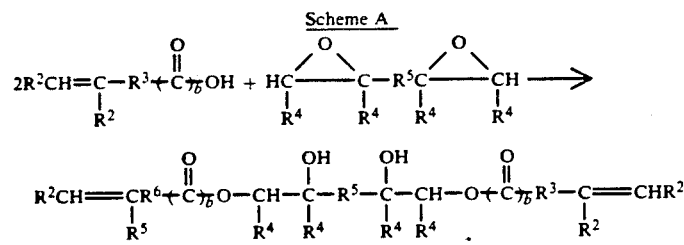

wherein each $R^2$ is independently hydrogen, halogen, cyano, lower alkyl having 1 to 4 carbon atoms, or phenyl; each $R^3$ and $R^5$ is independently a divalent linear, branched, or cyclic saturated or unsaturated aliphatic group having 1 to 20 carbon atoms and up to 3 ether oxygen atoms or carbonyloxy groups, an aromatic group having 6 to 20 carbon atoms, or a covalent bond; each $R^4$ is hydrogen or a lower alkyl group having 1 to 4 carbon atoms or an $R^4$ together with atoms in $R^5$ or another $R^4$ and the atoms to which both $R^5$ and $R^4$ are attached form a 5- or 6-membered ring; and b is 0 to 1, with the proviso that when $R^3$ is a covalent bond, then b is 1.

Suitable ethylenically-unsaturated acids which can be used in preparing the ethylenically-unsaturated diols according to Scheme A, include, for example, β-phenylacrylic acid, α-cyanoacrylic acid, acrylic acid, methacylic acid, crotonic acid, cinnamic acid, and ester acids such as the half acrylic or methacrylic acid-half dicarboxylic acid esters of alkylene glycol, e.g., ethylene glycol half acrylic ester-half succinic ester.

Suitable ethylenically-unsaturated alcohols which can be used in preparing the ethylenically unsaturated diols according to Scheme A include, for example, allyl alcohol, methallyl alcohol, and the ethylenically unsaturated esters and ethers of aliphatic diols such as 2-allyloxyethanol, 2-acryloyloxyethanol, and 3-methacryloxypropanol;

Suitable ethylenically-unsaturated phenols which can be used include, for example, 2-allylphenol, 4-allylphenol, and 2-acryloylphenol.

Suitable diepoxides which can be used in preparing the ethylenically unsaturated diols according to Scheme A include, for example, the diglycidyl ethers of bisphenols such as catechol, resorcinol, hydroquinone, bis(4-hydroxyphenyl)methane and bis(4-hydroxyphenyl)-dimethylmethane; the diglycidyl ethers of aliphatic and cycloaliphatic diols such as ethylene glycol, 1,4-butanediol, 1,4-but-2-enediol, bis(1,4-hydroxymethyl)-cyclohexane; the diglycidyl ethers of poly(oxyethylene)diols; poly(oxypropylene)diols, and poly(oxytetramethylene)diols, the diglycidyl ethers of polyester diols such as poly(carbonate)diols, poly(caprolactone)diols, poly(ethylene adipate)diols; the diglycidyl esters of dibasic aromatic, aliphatic and cycloaliphatic acids such as phthalic acid, hexahydrophthalic acid succinic acid, maleic acid, itaconic acid, glutaric acid, adipic acid, and oxydipropionic acid, and carbocyclic diepoxides such as bis(2,3-epoxycyclopentyl) ether and 3,4-epoxy-6-methylcyclohexylmethyl 4-epoxy-6-methylcyclohexanecarboxylate. Examples of other diepoxides can be found in Lee and Neville, *Handbook of Epoxy Resins*. McGraw-Hill Book Co., 1967.

Another preferred class of ethylenically unsaturated diols is the reaction product of an ethylenically-unsaturated epoxide with an organic dicarboxylic acid, diol, or dihydric phenol. Such as reaction can be represented by the following reaction scheme:

SCHEME B

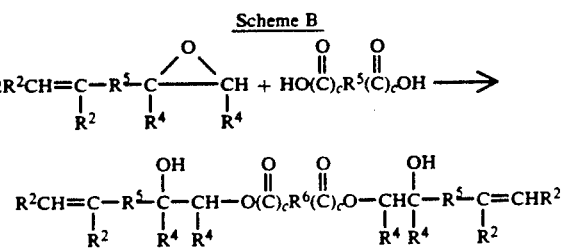

wherein $R^2$, $R^4$, and $R^5$ are as defined above; each $R^6$ is a saturated or unsaturated divalent alkyl group having 2 to 40 or more carbon atoms and up to 5 ether oxygen atoms or an aromatic group having 6 to 14 carbon atoms; and c is 0 or 1.

Suitable ethylenically-unsaturated epoxides which can be used in preparing the ethylenically-unsaturated diols according to Scheme B include, for example, allyl glycidyl ether, glycidyl acrylate, 1-ethenyl-1,2-epoxycyclohexane, and 3,4-epoxycyclohex-1-ene.

Suitable dicarboxylic acids which can be used in preparing ethylenically-unsaturated diols according to Scheme B include, for example, succinic acid, maleic acid, itaconic acid, glutaric acid, adipic acid, oxydipropionic acid, phthalic acid, isophthalic acid, terephthalic acid, hexahydropthalic acid, and dimer acids such as Hystrene ™ 3695, available from Humko Sheffield Chemical Co.

Suitable diols and dihydric phenols which can be used in preparing the ethylenically-unsaturated diols according to Scheme B are, for example, those mentioned above as being suitable for use in preparing the ethylenically-unsaturated diols according to Scheme A.

A further preferred class of ethylenically-unsaturated diols is the reaction product of a monoepoxide with an ethylenically-unsaturated dicarboxylic acid which is the reaction product of an ethylenically-unsaturated alcohol with a dianhydride. Such a reaction can be represented by the following reaction scheme:

SCHEME C litic dianhydride, 1,2,4,5-cyclohexanetetracarboxylic-1,2:4,5-dianhydride, 1,1,2,2,-ethanetetracarboxylic-1,2:1,2-dianhydride, 1,2,3,4-butane-1,2,:3,4-dianhydride, 4,4'methylenediphthalic anhydride, and 1,4-5,8-naphthalene-tetracarboxylic-1,8:4,5-dianhydride. Additional suitable dianhydrides are disclosed in U.S. Pat. No. 4,417,045 (Nimry et al.) which is incorporated herein by reference for that purpose.

Suitable monoepoxides which can be used in preparing the ethylenically-unsaturated diols according to Scheme C include, for example, 2,3-epoxybutane, phenyl glycidyl ether, 1,2-epoxydodecane, 1,2-epoxycyclohexane, and methyl 1,2-cyclohexanecarboxylate.

The addition reaction of acids or phenols with epoxides, as is used in each of Schemes A, B, and C, is well known and is described, for example in U.S. Pat. Nos. 2,824,851 and 3,301,743. The reaction is generally carried out in the absence or presence of solvents, such as for example, butyl acetate, ethyl acetate, tetrahydrofuran, acetone, methyl ethyl ketone, hexane, toluene, and chloroform. The reaction can be accelerated by use of 0.01 to about 5% by weight of a catalyst such as a tertiary amine, an alkali metal hydroxide, an alkali metal salt of an organic acid, a chromium salt, a sulfonium compound, a phosphonium compound, a phosphine, an arsine, or a stibine. The reaction can be run at a temperature of about 40° to 110° C. or higher. To prevent unintentional polymerization, the reaction can be conducted in the presence of 0.001 to about 0.1 by weight of a polymerization inhibitor such as 4-methoxyphenol, 4,4'-bis(2,6-ditertiarybutylphenol) and the like which

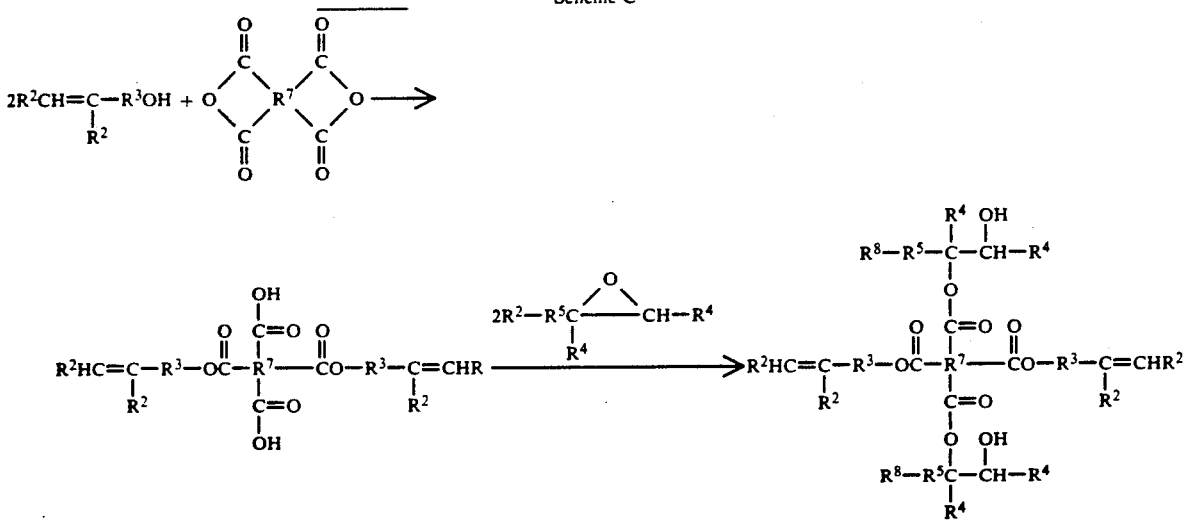

wherein $R^2$, $R^3$, $R^4$, and $R^5$ are as defined above;
$R^7$ is a tetravalent alkyl group having 2 to 20 carbon atoms or a tetravalent cycloalkane group having 5 to 20 carbon atoms or a tetravalent arene-containing group having 6 to 20 carbon atoms; and
$R^8$ is hydrogen or a lower saturated or unsaturated alkyl group having 1 to 4 carbon atoms.

Suitable ethylenically-unsaturated alcohols which can be used in preparing the ethylenically-unsaturated diols according to Scheme C include, for example, those mentioned above for use in preparing the ethylenically-unsaturated diols according to Scheme A.

Suitable tetracarboxylic acid dianhydrides which can be used in preparing the ethylenically-unsaturated diols according to Scheme C include, for example pyromelare effective in the presence of oxygen; and phenolthiazine and copper power which are effective in the absence of oxygen (i.e. under nitrogen). Other polymerization inhibitors are described in U.S. Pat. No. 4,162,274.

The addition reaction of aliphatic or cycloaliphatic alcohols to epoxides as is used in each of Schemes A and B is also well known and, generally, is carried out in the presence of a catalyst such as boron trifluoride etherate, stannic chloride, aluminum chloride, potassium hydroxide, tetraalkyl ammonium halides, or a combination of palladium and copper chloride in the presence of oxygen.

In addition to the ethylenically-unsaturated aliphatic or cycloaliphatic diols whose preparation can be represented by Schemes A, B, and C, another class of diols that can be used to prepare thermoplastic polyethylenically unsaturated cardo polyurethanes of this invention are polyhydric alcohols, such as, those represented by the following formulae:

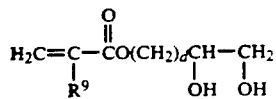

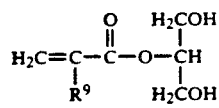

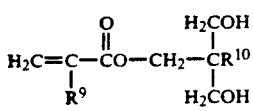

wherein $R^9$ is hydrogen or a methyl group, d is an integer of 1 to 4, and $R^{10}$ is hydrogen or a lower alkyl group having 1 to 4 carbon atoms as are disclosed in U.S. Pat. Nos. 4,366,301 (LeRoy), U.S. Pat. No. 4,578,504 (Hammar), and U.S. Pat. No. 3,210,327 (Gallano).

A further class of such polyhydric alcohols are those which can be represented by the formula:

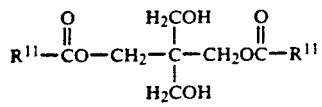

wherein $R^{11}$ represents an unsaturated aliphatic group having 2 to 24 carbon atoms and which can be prepared, for example, by esterifying the bis(5-hydroxymethyl)-1,3-dioxane represented by the formula

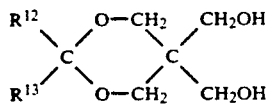

wherein $R^{12}$ is a lower alkyl group of 1 to 6 carbon atoms or phenyl, the phenyl group being optionally substituted with one or more groups, e.g., ethyl, chloro, methoxy or dimethylamino group, and $R^{13}$ is independently hydrogen or $R^{12}$, with aliphatic carbonyl compounds represented by the formula $R^{11}$

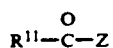

wherein Z is hydroxyl, halogen, alkoxy having 1 to 4 carbon atoms or

wherein $R^{11}$ is as defined above, to provide a polyethylenically unsaturated diorganic group-substituted 5,5-bis(hydroxymethyl)-1,3-dioxane ester having the general formula

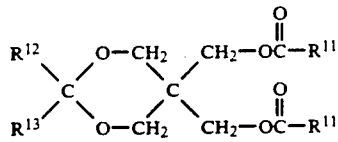

wherein $R^{11}$, $R^{12}$, and $R^{13}$ are as defined above, and hydrolyzing the dioxane moiety of the dioxane ester to provide the polyethylenically unsaturated diol.

A class of the optional long-chain aliphatic group-modified diols which can be used are, for example, the addition reaction products of a long-chain aliphatic carboxylic acid or alcohol having 4 to 30 carbon atoms and a diepoxide. Suitable long-chain aliphatic monocarboxylic acids include, for example, caprylic acid, nonanoic acid, lauric acid, palmitic acid, stearic acid, oleic acid, linoleic acid, and the fatty acids obtained from animal and vegetable oils. Suitable long-chain aliphatic alcohols include, for example, octyl alcohol, lauryl alcohol, hexadecanol, and octadecanol. Suitable diepoxides include, for example, those mentioned above for use in the reaction represented by Scheme A. These acids and alcohols are preferably reacted with the diepoxides at ratios of about 0.8 to 1.2 moles of carboxylic acid or alcohol to one epoxy equivalent of diepoxide under reaction conditions as described above with regard to Schemes A, B, and C.

Another class of long-chain aliphatic group-modified diols is the reaction product of an ethylenically unsaturated acid and a modified epoxy resin obtained by reacting an hydroxy group-containing glycidyl ether resin with either a fatty acid ester oil or a lower alkyl ester of a fatty acid, the fatty acid in both esters having 4 to 30 carbon atoms, in the presence of a basic alcoholysis catalyst. Such reaction products and their preparation are described in U.S. Pat. No. 3,876,432 (Carlick et al.). Suitable hydroxyl group-containing glycidyl ether resins include, for example, Epon TM resins available from Shell Chemical Co. such as Epon TM 834, Epon TM 836, Epon TM 1001, Epon TM 1002, and Epon TM 1004.

A still further class of long-chain aliphatic group-modified diols is the reaction product of an ethylenically unsaturated organic acid such as acrylic acid, methacrylic acid, and chloroacrylic acid, and a modified epoxy resin obtained by reacting a hydroxy group-containing glycidyl ether resin, described above, with long-chain aliphatic isocyanates having 4 to 30 carbon atoms, such as, for example, octyl isocyanate, dodecyl isocyanate, and stearyl isocyanate, the acid reacting with the epoxy groups of the resin and the isocyanate reacting with the hydroxy groups of the resin. Such reactions are well known in the art.

Diamines useful as an optional portion of component (a) of the present invention include aromatic primary and secondary amines, such as, for example, 2,6-diaminoanthraquinone, 2,4-diaminotoluene, 1,5-diaminonaphthalene, 2,7-diaminofluorene, 1,4-bis(N-methylamino)benzene, bis(4-aminophenyl)methane, bis(3,5-diethyl-4-aminophenyl)methane, bis(4-methylamino-3-chlorophenyl)methane and the carbonyloxy group-containing diamines disclosed in U.S. Pat. No. 3,681,290 (Meckel et al.) which is incorporated herein by reference for that purpose. Aliphatic and cycloaliphatic primary and secondary amines useful as component (a) of the present invention include 1,4-diaminobutane, 1,4-bis(methylamine)butane, bis(4-methylaminocyclohexyl)methane, bis(4-aminocyclohexyl)-methane, 3,5,5-trimethyl-1-amino-3-aminomethylcyclohexane, and polymeric diamines such as the polyoxyalkylene diamines, e.g., the Jeffamines ™ available from Jefferson Chemical Co. With the inclusion of amines in the reaction mixture, the reaction product contains urea groups in addition to the urethane groups and the reaction product becomes a polyethylenically-unsaturated polyurethane/urea product which can be represented by the formula above in which X is —NR— where R is hydrogen or lower alkyl having 1 to 6 carbon atoms.

Dithiols useful as an optional portion of component (a) of the present invention include aliphatic or cycloaliphatic dithiols which can contain an aromatic group such as 1,4-bis(2-mercaptoethyl)benzene. Dithiols can be aliphatic dithiols having, for example 2 to 30 carbon atoms such as, for example, ethylene dithiol, 1,4-butanedithiol, bis(mercaptoethyl)ether and bis(1,4-dimercaptomethyl)-cyclohexane, With the inclusion of dithiol in the reaction mixture, the reaction product contains thiocarbamato groups,

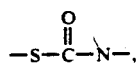

in addition to the urethane groups, and the reaction product becomes a polyethylenically-unsaturated polyurethane/thiourethane which can be represented by Formulas I and II in which X is —S—.

Polyols, polyamines, and polythiols which have more than two hydroxyl, amino, or thiol groups, respectively, may also be present in the reaction mixture from which the ethylenically-unsaturated, cardo polyurethanes of the invention are prepared provided that the amounts used are not sufficiently group, e.g., generally less than 5 weight percent of the reaction mixtures, so as to cause gelling and/or insolubility of the product.

The diisocyanate, component (b), of the polyethylenically-unsaturated cardo polyurethane polymers of the invention, can be any organic diisocyanate and includes those linear, branched, and cyclic aliphatic, aromatic and heterocyclic diisocyanates which are well-known in the polyurethane field. One or more diisocyanates may be used. Preferred diisocyanates include, for example, 2,4-tolylene diisocyanate, 3,5,5-trimethyl-1-isocyanato-3-isocyanatomethylcyclohexane, bis-(4-isocyanatophenyl)methane, bis-(4-isocyanatocyclohexyl)methane, hexamethylene diisocyanate, 1,3-di(isocyanatoethyl)-hydantoin, trimethylhexamethylene diisocyanate, and m- and p-tetramethylxylylene diisocyanates.

Preferred cardo diols are those that can be prepared from a) cardo bisphenols, b) cardo diglycidyl ethers, c) cardo dicarboxylic acids, d) cardo dicarboxylic acid anhydrides, and e) cardo di(secondary amines) by reaction with hydroxylating agents in a manner similar to that shown under Schemes A, B, and C.

Preferred cardo bisphenols from which cardo diols can be prepared are as follows:

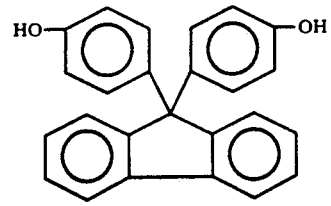

and other substituted fluorene bisphenols that are described in U.S. Pat. No. 4,707,534 (Schultz);

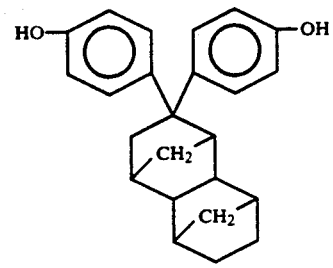

and other cycloaliphatic bisphenols that are described in U.S. Pat. No. 3,298,998;

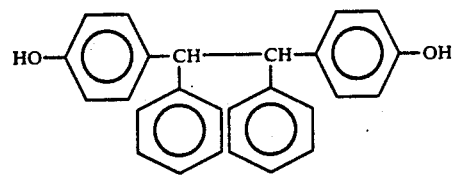

described in U.S. Pat. No. 3,332,908;

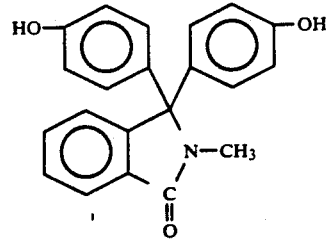

described in U.S. Pat. No. 3,758,422;

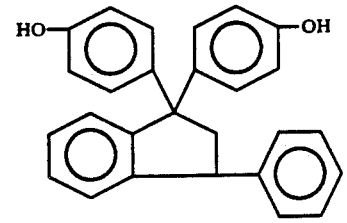

described in U.S. Pat. No. 4,340,454; and the hydroxylated compounds prepared from these diphenols such as

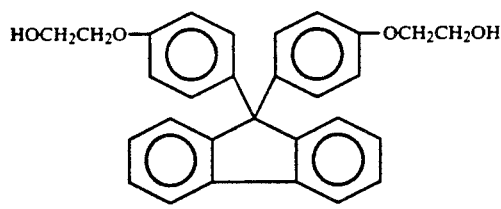
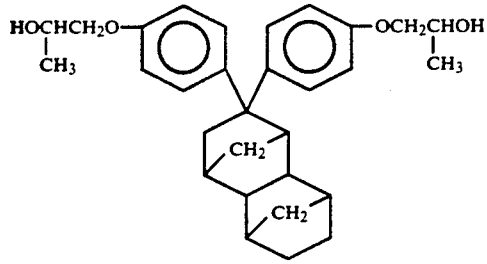
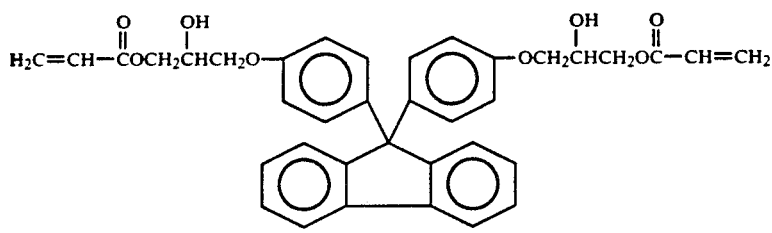
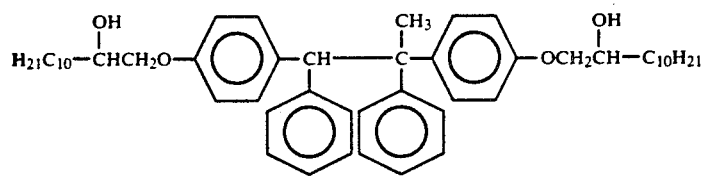
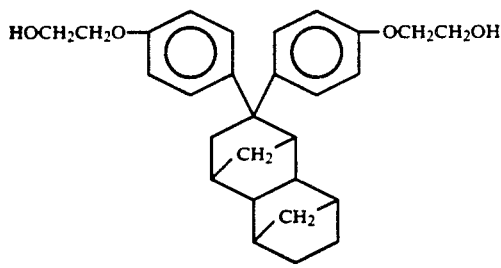
Cardo diols can be derived from cardo bisphenols, such as those listed above, by conversion to diglycidyl ethers followed by reaction with a saturated or unsaturated alcohol or carboxylic acid having one to 20 carbon atoms or a phenol having 6 to 14 carbon atoms. Examples of such cardo diols are:
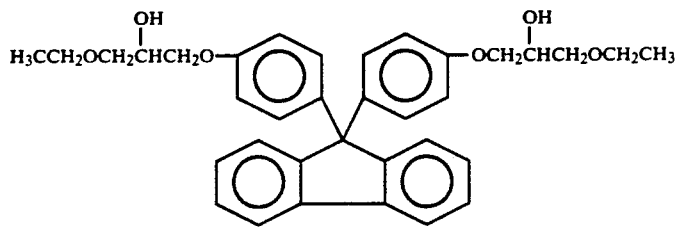

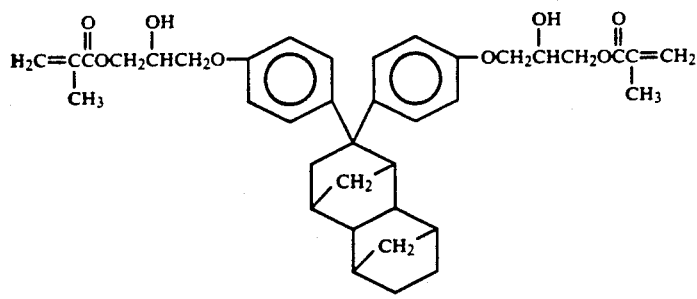

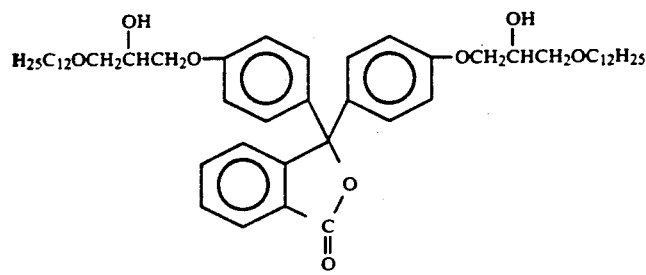

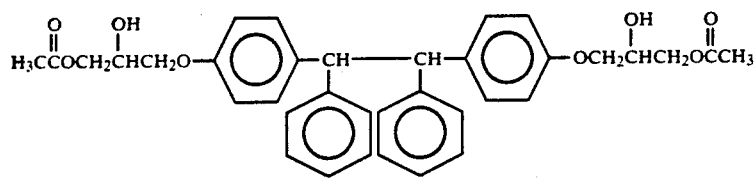

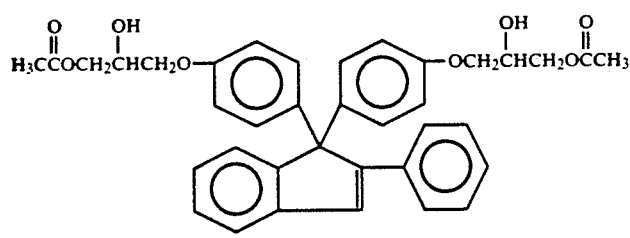

Cardo diols can also be derived from cardo dicarboxylic acids by reaction with hydroxylating agents. Many cardo dicarboxylic acid are described in U.S. Pat. Nos. 2,208,058; 3,143,530; 3,287,321; 3,505,298; and in Macromolecules 14, 486–493 (1981). An example of such diols is:

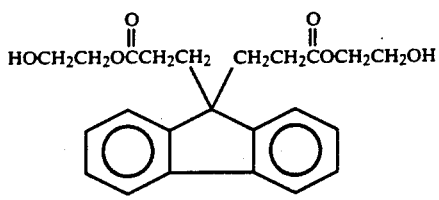

Cardo diols may be derived from cardo dicarboxylic acid anhydrides by reaction with alcohols followed by reaction with hydroxylating agents. Many cardo dicarboxylic acid anhydrides are described in U.S. Pat. No. 3,944,583. Examples of such diols are:

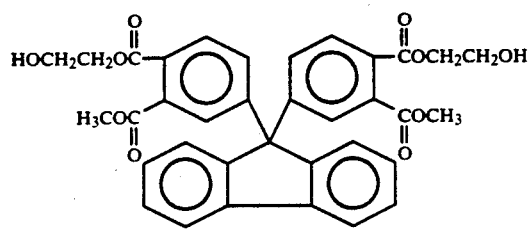

-continued

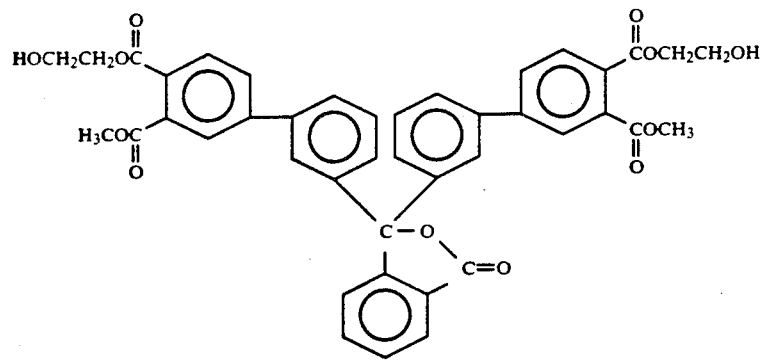

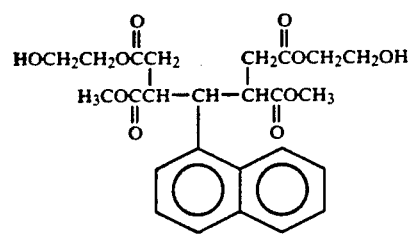

Cardo diols can be derived from cardo diamines, especially cardo di(secondary amines), by reaction with hydroxylating agents. Many such diamines are described in U.S. Pat. Nos. 2,320,029; 4,499,165; 4,626,361; and 4,684,678. Examples of such diols prepared from diamines are:

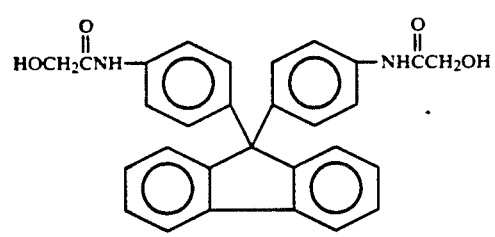

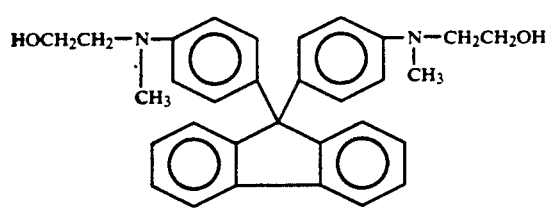

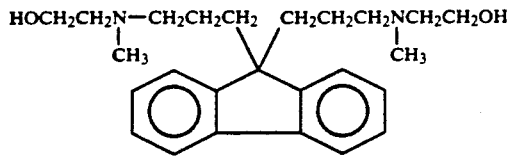

Cardo diamines can be used directly in the synthesis of the compounds of the invention. Examples of such cardo diamines are:

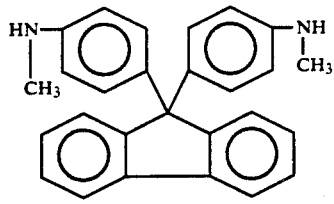

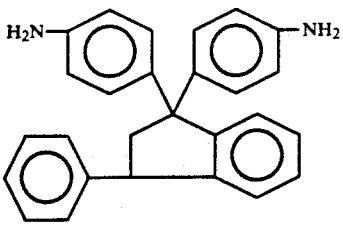

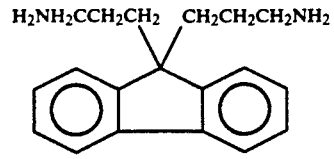

Cardo group containing diisocyanates that can be used are described in U.S. Pat. No. 3,004,038 and in Belgium Patent No. 668,591. Other diisocyanates that can be used in the diisocyanates that can be obtained by the reaction of primary cardo diamines with phosgene in accordance with procedures well known in the art. Examples of such cardo diisocyanates are:

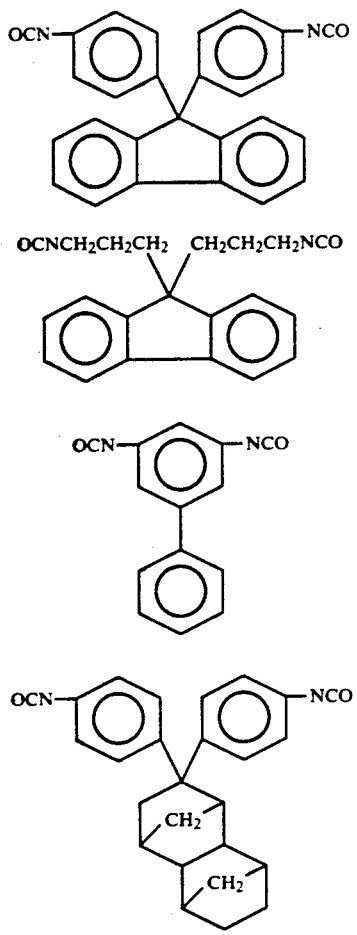

The thermoplastic, polyethylenically-unsaturated, cardo polyurethanes of the invention can be prepared by heating the reaction mixture of components (a), (b), and (c) at a temperature of about 25° to 150° C., preferably at about 50° to 100° C., for from 1 to 100 hours, generally 6 to 24 hours. The reaction is carried out at about 10 to 75 weight percent solids, preferably 40 to 60 weight percent solids, in a solvent such as butyl acetate, methyl ethyl ketone, or tetrahydrofuran. Preferably, the reaction is run under a dry air atmosphere using mechanical agitation and in the presence of a free-radical inhibitor such as 4-methoxyphenol at about 100 to 1000 parts per million. Also, a urethane catalyst such as dibutyltin dilaurate is used at a concentration of about 0.05 to 1.0 percent by weight with respect to total solids.

The mixture of diols, and optionally diamines dithiols and solvent, polymerization inhibitor, and catalyst are stirred while heating until the mixture becomes homogeneous. Next, the diisocyanate is added and the reaction mixture heated at 40° to 100° C., preferably 50° to 90° C. for 1 to 100 hours, preferably less than 24 hours, until analysis (infrared spectrometry) shows the desired degree of completion. If desired, the reaction can then be quenched by addition of a mono alcohol such as butyl alcohol (to remove unreacted—NCO by formation of a urethane, i.e., —NHCOOBu). Where diamines are used in the composition, it is often desirable that it be added portionwise over about one hour to the reacting mixture after the diisocyanate has been added in order to maintain a homogeneous polymerization.

The ethylenically-unsaturated diol is preferably present in an amount of at least 5 weight percent of the total diols in components (a) and (c). Component (a), the saturated aliphatic or cycloaliphtic diol, the ethylenically unsaturated diol, the optional long chain aliphatic group-modified diol, the optional diamine and optional dithiol is preferably added in an amount from about 10 to 90 weight percent of total solids. More preferably 20 to 60 weight percent of total solids is ethylenically unsaturated diol. Most preferably the ethylenically unsaturated diol is 30 to 50 weight percent of total solids and 9 to 30 weight percent of total solids is the long chain aliphatic group-modified diol component (c), the cardo diols, diamines or diisocyanates are from 1 to 100 weight percent of total solids, more preferably 5 to 40, most preferably 10 to 30 weight percent of total solids. Total diisocyanates, should provide 0.75 to 1.2, preferably 0.8 to 1.0, equivalents of NCO per equivalent of hydroxyl, amino, and thio groups present.

The thermoplastic polyethylenically-unsaturated cardo polyurethanes of this invention are particularly useful as coatings on substrates such as wood, plastics, metals, and ceramics. The coatings are generally applied as organic solvent solutions. Suitable solvents include, for example, acetone, methyl ethyl ketone, tetrahydrofuran, and propyl acetate. Generally, the organic solvent solutions contain about 5 to 50, preferably 10 to 30, weight percent of the cardo polyurethane.

Coatings prepared from the reaction product of 20 to 60 weight percent ethylenically-unsaturated diol, 5 to 40 weight percent cardo compound, and sufficient diisocyanate to provide 0.8 to 1.0 mole of isocyanate groups per mole of hydroxyl and amino groups are particularly suitable for use, for example, on furniture of wood, when the coating is required to be worked, e.g., sanded, polished, etc., while in the dried but uncured state, and which can then be cured to form a solvent and stain resistant finish.

Coatings prepared from the reaction product of 30 to 50 weight percent ethylenically-unsaturated diol, 9 to 30 weight percent long chain aliphatic group-modified diol, 10 to 30 weight percent cardo monomer and sufficient diisocyanate to provide 0.8 to 1.0 moles of isocyanate groups per mole of hydroxyl and amino groups are particularly suitable where the coating is required to worked in the dried but uncured state, which coating can then be cured to form a solvent and stain resistant finish, and where the finish does not cause whitening on exposure to temperature cycling, i.e., cold checking, such as may occur on furniture of wood with other finishes.

The thermoplastic polyethylenically-unsaturated cardo polyurethanes of the invention can also be used in binder systems, imaging systems, embossable coatings, adhesives, molding compositions, and information storage systems.

Polymerization initiators are generally required as part of the coating solution when curing, i.e., crosslinking is to be carried out thermally or by the use of actinic radiation. Generally, curing by the use of actinic radiation is preferred.

Suitable heat activated free-radical initiators include, for example, benzoyl peroxide, lauroyl peroxide, dicyclohexyl percarbonate, and azo-bis(isobutyronitrile). Generally, the heat activated initiator is present in an amount of about 0.1 to 5.0 weight percent based on the amount of the cardo polyurethane. When the initiator is present in an amount less than about 0.1 weight percent, the polymerization rate is extremely slow. When the initiator is present in excess of about 5 weight percent, no corresponding improvement in polymerization is generally seen.

Suitable radiation activated initiators include, for example, acyloin and derivatives thereof such as benzoin, benzoin methyl ether, benzoin isopropyl ether, benzoin isobutyl ether, and 2-hydroxy-2-methyl-1,2 diphenylethanone; diketones such as benzil and diacetyl; and phenones such as acetophenone, 2,2,2-tribromo-1-phenylethanone, 2,2-diethoxyacetophenone, 2,2-dimethoxy-2-phenylacetophenone, 2,2,2-tribromo-1-(2-nitrophenyl)ethanone, benzophenone, 4,4'-bis(dimethylamino)benzophenone, and 1-hydroxycyclohexyl phenyl ketone. Generally, the radiation activated initiator is present in an amount of about 0.01 to 10 weight percent, preferably about 0.25 to 5 weight percent, of the total polymerization composition containing the polyurethane. When the initiator is present in an amount less than about 0.01 weight percent, the polymerization rate is extremely slow. When the initiator is present in excess of about 10 weight percent, no corresponding improvement in polymerization is generally seen.

The cardo polyurethane coating solution can be formulated with polymerizable ethylenically unsaturated modifying monomers such as acrylic acid, acrylic acid derivatives, and vinyl compounds, as well as ethylenically-unsaturated oligomers and resins to enhance the properties of the coatings, e.g., hardness, flexibility, and adhesion.

Suitable ethylenically-unsaturated monomers include, for example methyl methacrylate, ethyl acrylate, 2-ethylhexyl acrylate, chlorohexyl acrylate, styrene, 2-chlorostyrene, 2,4-dichlorostyrene, acraylic acid, acrylamide, acrylonitrile, t-butyl acrylate, methylacrylate, butyl acrylate, 2-(N-butylcarbamyl) ethyl methacrylate, 2-(N-ethylcarbamyl)ethyl methacrylate, 1,4-butylene dimethacrylate, or diacrylate, ethylene dimethacrylate, hexamethylene diacrylate or dimethacrylate hexamethylene diacrylate or dimethacrylate, glyceryl diacrylate or dimethacrylate, glyceryl triacrylate or trimethacrylate, pentaerythritol triacrylate or trimethacrylate, pentaerythritol tetraacrylate or tetramethacrylate, diallyl phthalate, dipentaerythritol pentaacrylate, neopentylglycol diacrylate, and 1,3,5-tri(2-methacryloyloxyethyl)-s-triazine.

Suitable ethylenically-unsaturated oligomers and resins include, for example, acrylated alkyls, acrylated epoxies, acrylated polyesters, acrylated polyacrylates such as the reaction product of acrylic acid with the copolymer methyl methacrylate and glycidyl acrylate, acrylated urethane and acrylated cellulose oligomers and resins. Generally, up to about one part by weight of modifying monomer, oligomer, and/or resin can be used per part by weight of the ethylenically-unsaturated cardo polyurethane. Non-reactive film-forming resins such as poly(methyl methacrylate cellulose acetate, cellulose acetate butyrate, cellulose acetate propionate, and nitrocellulose and reactive film-forming polymers such as acrylated acrylics can also be included.

The coating solutions may also be formulated with blocked diamines, for example, enamines such as XE-4131 available from Sherex Chemical Co., ketimines such as H-1 available from Shell Chemical Company, and oxazolidines such as Hardener OZ available from Mobay Corp., Coatings Div. The cardo polyethylenically unsaturated polyurethane coating solution can be formulated with melamines such as Resimine 745 available from Monsanto Company or with urea-formaldehyde resins such as Beckamine 21-510-P138 available from Reichold Chemicals, Inc. along with a suitable acid catalyst such as p-toluenesulfonic acid or a latent acid catalyst. Formulation with blocked diamines, melamines or urea-formaldehyde resins may crosslink the coating before curing the coating by irradiation. This controlled crosslinking may in some cases provide a more easily workable coating before curing of the coating by irradiation.

The coating solutions can also include a variety of additives utilized for their known purposes such as stabilizers, inhibitors, lubricants, flexibilizers, pigments, dyes, fillers such finely divided silica, diatomaceous earth, metal oxides, fiber glass, glass bubbles, and talc. Fillers can generally be used in proportions up to about 200 weight percent based on the weight of the ethylenically unsaturated materials present, but preferably are used in amounts up to about 50 weight percent. However, in formulations where dense materials such as heavy metals and metal oxides are used as fillers, up to about 500 weight percent or more can generally be used. When the coating is to be cured by, e.g., actinic radiation, it is desirable that the additives be transparent to the radiation.

The coating solutions containing the ethylenically unsaturated cardo polyurethanes can be applied to various substrates by known procedures such as conventional spraying, electrostatic spraying, dipping, brushing, roller coating, curtain coating and the like. Substrates which can be coated include plastics, metals, ceramics, and wood.

After coating, the solvent is allowed to evaporate, with added heat and the use of a forced air stream where necessary, until the coating is dry to form an intermediate coating. Additional intermediate coatings may be applied, if desired, to increase coating thickness. At this point, in the case of a coated finished wood article, this solid intermediate stage coated surface can be repaired, if necessary, i.e., the coating may be removed with solvent and the article recoated, or it can be sanded, buffed, and polished to achieve the desired surface appearance.

When the desired surface appearance has been achieved, the coating is cured such as by infrared radiation, e.g., thermal energy, by actinic radiation at wavelengths within the ultraviolet and visible spectral regions, or by ionizing radiation, e.g., electron beam radiation.

When thermal energy is used for curing, the coating article is heated, preferably at a temperature of about 50° to 150° C., for a period of time sufficient to achieve the desired degree of crosslinking of the coating. Generally, adequate crosslinking can be achieved in from about 1 to 10 minutes or more depending on coating thickness, amount of polymerizable materials, the polymerization initiator being used, and the temperature. When temperatures above about 150° C. are used for a sufficient period of time, e.g., 1 minute to several hours, crosslinking may occur without added polymerization initiators.

Suitable sources of actinic radiation include, for example, mercury, xenon, carbon arc, tungsten filament lamps, and sunlight. Exposures may be from less than about one second to ten minutes or more depending on the amount of polymerizable materials, the polymerization initiator being used, the radiation source, the distance of the coating from the source, and the coating thickness.

When curing is effected by electron beam radiation no polymerization initiator is required. Generally, the dosage necessary is from less than 1 megarad to about 30 megarads or more. An advantage of curing with electron beam radiation is that highly pigmented coatings can be more effectively cured at a faster rate than when actinic radiation is used for curing.

Shaped articles can also be formed from compositions containing the ethylenically-unsaturated cardo polyurethanes of this invention because of their thermoplastic nature. Generally, when the ethylenically-unsaturated cardo polyurethanes are to be used for forming shaped articles, the solvent in which the polyurethane is prepared is removed, for example, by drying or by precipitation in a non-solvent for the polyurethane, e.g., hexane, naphtha, or cyclohexane followed by drying. Shaped articles which can be prepared from the ethylenically-unsaturated cardo polyurethanes include, for example, gears, connectors, containers, and the like.

Articles can be formed by, for example, compression molding, extrusion molding, and injection molding. The composition may also contain polymerizable ethylenically-unsaturated modifying monomers, ethylenically-unsaturated oligomers and resins, and conventional additives as described with regard to the coatings of this invention. The composition preferably also contains free-radical polymerization initiators, as described hereinabove with regard to coatings, which effect curing of the ethylenically-unsaturated polyurethane upon application of thermal energy or actinic radiation. Generally, thermally activatable initiators are used in an amount of about 0.1 to 5 weight of ethylenically-unsaturated material present and actinic radiation activatable initiators are used in an amount of about 0.01 to 3 weight percent based on the weight of ethylenically-unsaturated material present.

After the shaped article has been formed, the article can be worked by, e.g., sanding, polishing, machining, etc. When the article is in the final form desired, it can be cured by application of heat or actinic radiation such that it becomes insoluble and infusible. Generally, when the shaped article has a thickness greater than about 5 millimeters, curing is preferably carried out thermally at temperatures of about 50° to 150° C. for a time sufficient to cure the article. The length of time for cure is dependent on the thickness of the article, the amounts of polymerizable materials and initiator, and the curing temperature. The shaped article can also be cured by ionizing radiation such as electron beam radiation. When curing is effected by electron beam radiation, the composition need not contain a polymerization initiator. Also, when temperatures about 150° C. are used for a sufficient period of time, e.g., 1 minute to several hours, crosslinking may occur without added polymerization initiators.

The following nonlimiting examples are provided to further illustrate the invention. In this examples, all parts and percentages are by weight unless otherwise specified.

A. Preparation of Polyethylenically-Unsaturated Organic Diol I (PUD-I)

Into a 22 L flask equipped with an overhead stirrer, reflux condenser, heating mantle, and air purge were charged 10.6 Kg (60 epoxy equivalents) DERTM 332 (diglycidyl ether of bisphenol A available from Dow Chemical Co.), 2.65 g 4-methoxyhydroquinone, 13.6 g AMC-2TM (chromium acid salt blend available from Cordova Chemical Co.), and 1.65 Kg (22.9 equivalents) acrylic acid. The reaction mixture was heated with stirring for 35 minutes. A dry air purge was initiated with continued heating and stirring and, after 50 minutes, the reaction mixture was at a temperature of 45° C. and had become a clear, homogeneous solution. Heating and stirring were continued with the temperature of the reaction rising to 140° C. over a period of 3.5 hours. Then the temperature allowed to drop to 100° C. and was held at 100° C. for the remainder of the reaction time. After 3, 4, and 4.25 hours reaction time, there were added 0.89 Kg (12.35 equivalents), 0.85 Kg (11.80 equivalents), and 0.94 Kg (13.05 equivalents), respectively, acrylic acid (60 acid equivalents total). After 5.25 hours reaction time, an additional 0.056 Kg acrylic acid (1.3 equivalent excess) was added. After 6 hours reaction time, an additional 26.4 g AMC-TM was added. After a total reaction time of 23.3 hours, analysis by titration indicated 0.29% residual carboxylic acid groups and 0.1% residual epoxy groups. After 25.4 hours, the reaction mixture was allowed to cool. Infrared spectroscopy (IR), $^1$H nuclear magnetic resonance ($^1$H-NMR), reverse phase chromatograph (RPC), and gel permeation chromatography (GPC) indicated the reaction mixture to have a structure consistent with that expected for the adduct of acrylic acid and diglycidyl ether of bisphenol A:

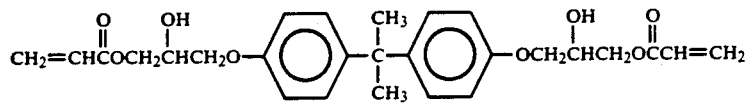

B. Preparation of Polyethylenically-Unsaturated Diol (PUD-II)

The procedure for the preparation of PUD-I was followed using 1853 g, 7.5 epoxy equivalents, of DRHTM 1510 (the glycidyl ether of hydrogenated bisphenol A available from Shell Chemical Co. having an epoxy equivalent weight of 247.1) and 540 g (7.5 equivalents) of acrylic acid in the presence of 0.375 g of 4-methoxyphenol and 3.75 g of AMC-2. The mixture was heated and stirred at 85° C. for about 17 hours to yield a material with less than 0.5% each residual epoxy and acid groups. Infrared (IR) and $^1$H nuclear magnetic spectroscopy (NMR) confirmed that the product obtained was 2,2-bis(4-[(3-acryloyloxy-2-hydroxy)propoxy]cyclohexyl)propane:

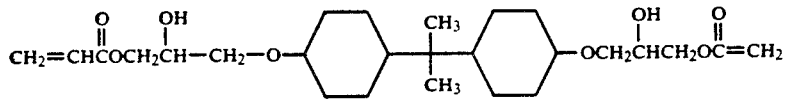

10

C. Preparation of a Long Chain Aliphatic Group-modified Polyethylenically Unsaturated Organic Diol III (PUD-III)

Into a 5L, 3-neck round bottom flask equipped with an overhead stirrer and dry air purge were charged 1148 g (6.52 epoxy equivalents) DER TM 332, 235 g (3.26 equivalents) acrylic acid, 872 g (3.26 equivalents) stearic acid (acid equivalent weight 267), and 6.5 g AMC-2 TM. The flask was fitted with a reflux condenser and the reaction mixture was heated at 80° C. under a dry air atmosphere with stirring and then held at 80° C. for 4 hours. The temperature was then raised to 90° C. and held for 15 hours. Analysis of the reaction product indicated 0.56% residual carboxyl groups and 5.8% residual epoxy groups. An additional 25 g (0.35 equivalents) acrylic acid were added, and the reaction maintained at 90° C. for 6 hours.

Analysis indicated 4.9% residual carboxyl groups and 5.4% residual epoxy groups. An additional 10 grams (0.14 equivalents) acrylic acid were added and the reaction mixture was maintained at 90° C. for an additional 15 hours. Analysis indicated 1.5% residual carboxyl groups and 1.5% residual epoxy groups. An additional 1.35 g AMC-2 TM were added and the reaction mixture was maintained at 90° C. for an additional 15 hours. Analysis indicated 2.5% residual carboxyl groups and 0.2% residual epoxy groups. The reaction mixture was allowed to cool and a waxy whitish-green/solid was obtained IR, $^1$H -NMR, RPC and GPC confirmed that the reaction product was the expected 2:1:1 mixture of adducts of acrylic acid, stearic acid, and the diglycidyl ether of bisphenol A, respectively,

D. Preparation of a Polyethylenically Unsaturated Cardo Diol

The procedure for the preparation of PUD-I was followed using 50 g (0.22 eq) 9,9-bis[4-(2,3-epoxypropoxy)phenyl]fluorene (prepared as described in U.S. Pat. No. 4,707,534), 15.6 g (0.22 eq.) acrylic acid, and 0.25 g AMC-2 in 65 g butyl acetate. The mixture was heated while stirring for 16 hours at 90° C. Analysis indicated that the reaction mixture contained 3.6% residual acid and no titratable epoxy. I.R. and $^1$H NMR spectrometry confirmed that the product was the expected 9,9-bis[4-(3-acryloyloxy-2-hydroxypropoxy)-phenyl]-fluorene. It was designated FEP/A.

E. In a manner similar to that used for the preparation of FEP/A, 1,1-bis[3,5-dimethyl-4-(3-acryloyloxy-2-hydroxypropoxy)-phenyl]cyclohexane was prepared by the reaction of 40 g (0.17 eq.) of 1,1-bis[3,5-dimethyl-4-(2,3-epoxypropoxyl]cyclohexane-(prepared as described in U.S. Pat. No. 3,298,998) 12.1 g (0.17 eq) acrylic acid, and 0.2 g AMC-2 in 35 g of butyl acetate by heating for 19 hours at 80° C. The diol obtained was confirmed to have the desired structure by IR and NMR spectrometry. It was designated CEP/A.

F. In a manner similar to that used for the preparation of FEP/A, the adduct of phenolphthalein and phenyl glycidyl ether was prepared by heating for 48 hours at 95° C. a mixture of 23.9 (0.15 eq.) of phenolphthalein, 23.7 g (0.15 eq) of phenyl glycidyl ether in a mixture of 48 g butyl acetate, and 48 g of methyl ethyl ketone in the presence of 0.5 g of benzyltriethylammonium chloride. The product was dried in a forced air oven at 100° C. The solid product obtained was confirmed by IR and $^1$H NMR to be

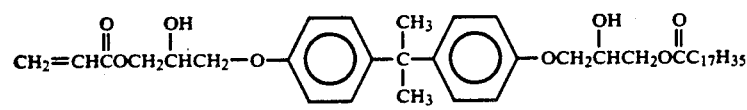

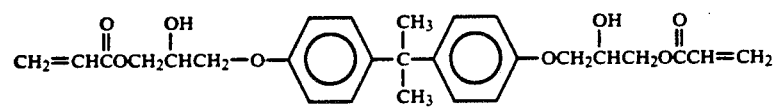

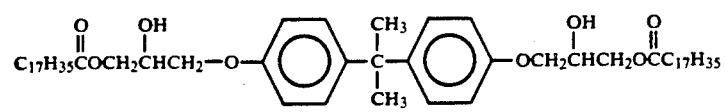

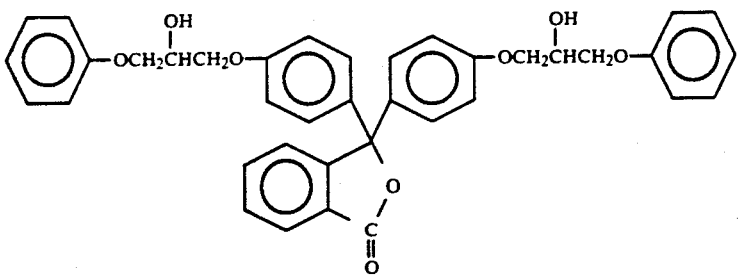

It was designated PHP/OH.

G. Preparation of the bis(hydroxyethyl)ether of the bisphenol of norcamphor

Into a 3-necked 500 ml round bottom flask equipped with an agitator was charged 40 g (0.28 eq.) of the bisphenol of norcamphor (prepared by heating for 18 hours at 55° C. a mixture of one equivalent weight of norcamphor and equivalent weights of phenol in the presence of 0.5 equivalents of hydrogen chloride and 0.075 equivalents of 3-mercaptopropionic acid, followed by hot water washes and recrystallization from 1,2-dichloroethane) and 80 g of ethanol. The mixture was heated to 50° C., 12.57 (0.314 eq) of sodium hydroxide in 40 ml of water added in one portion, and stirred for 45 minutes. To the solution, 26.45 g (0.33 eq) of ethylene chlorohydrin was added. After several minutes a precipitate appeared. The temperature was increased to 70° C. and held for 20 hours. The mixture was then cooled, diluted with 350 ml of ethyl acetate, and the solution washed sequentially with 150 ml of 3% aqueous sodium hydroxide and 200 ml of saturated brine. The washed solution was dried over magnesium sulfate. Concentration on a rotary evaporator produced a solid that was ground to a powder and dried for 5 hours at 60° to 70° C. The product obtained was confirmed by IR and NMR analysis to be

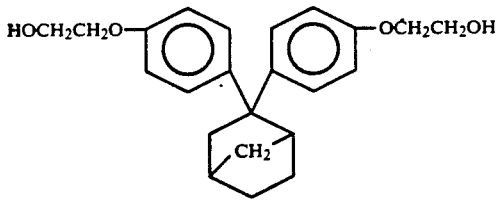

It was designated NOR/OH.

H. Preparation of the bis(hydroxyethyl) ether of the bisphenol of hexahydro-4,methano-indan-5-one-7. the procedure for the preparation of the bis(hydroxyethyl) ether of the bisphenol of norcamphor (described in G, above) was repeated using instead of norcamphor, 34.9 g (0.21 eq) of 5,5-bis(4-hydroxyphenyl)hexahydro-4, 7-methanodindane (prepared as described above for the preparation of the bisphenol of norcamphor from hexahydro-4,7-methanoindane (also called 8-ketocyclo[5.2.1.0 2,6]decane that is available from Aldrich Chemical Co.) and 19.75 g (0.24 eq.) of ethylene chlorohydrin in a solution of 9.4 g (0.23 eq). of sodium hydroxide in 68 g ethanol and 34 g water. There was obtained 34.5 of glassy solid that was confirmed by IR and NMR analysis to be

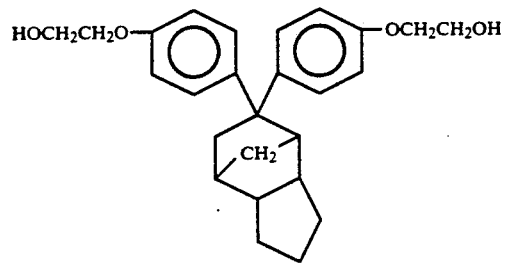

It was designated IND/OH.

I. Preparation of 9,9-bis(3-methyl-4isocyanatophenyl)fluorene.

Into a one liter 3-neck roundbottom flask equipped with an agitator was charged 500 g ethyl acetate and 75 g (0.40 eq) of 9,9- bis(3-methyl-4-aminophenyl)fluorene (prepared as described in Example 2 of U.S. Pat. No. 4,684,678 and having an amine equivalent weight of 188.8). Into the solution was bubbled in about 14.5 g (0.4 eq.) of hydrogen chloride producing a slurry of the amine hydrochloride. Into the slurry was bubbled about 100 g (about 1 equivalent) of phosgene and the mixture heated to 55° C. and held while stirring for 24 hours. At the end of this time, a clear light brown solution was obtained which was concentrated by heating at 80° C. to remove phosgene and then with decreasing water aspirator pressure while heating to 120° C. to yield 85.3 g of a solid. The solid was found to have an isocyanate equivalent weight of 220.8 (the theoretical is 214.8). It was characterized by IR, $^1H$ and $^{13}C$ NMR which showed the structure to be

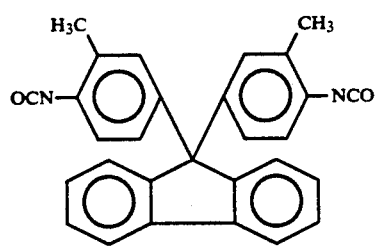

It was designated OTBAF/NCO.

J. Preparation of 9,9-bis(3-chloro-4-isocyanatophenyl)fluorene

The procedure for the preparation of 9,9-bis(3-methyl-4-isocyanatophenyl)fluorene (as described in H above) was repeated using 9,9-bis(3-chloro-4-aminophenyl)fluorene (CAF) in place of 9,9-bis(3-methyl-4- aminophenyl)fluorene, the dichlorodiamine being prepared as described in Example 4 of U.S. Pat. No. 4,684,678. The product obtained had an isocyanate equivalent weight of 256.6 (the theoretical is 235.5) and was confirmed by IR, $^1$H, and $^{13}$C NMR spectroscopy to be 9,9-bis(3-chloro-4-isocyanatophenyl)fluorene. It was designated CAF/NCO.

K. Preparation of 9,9-bis(4-isocyanatophenyl)fluorene

The procedure for the preparation of 9,9-bis(3-methyl-4-isocyanatophenyl)fluorene (as described in H above) was repeated using 9,9-bis(4-aminophenyl)fluorene in place of 9,9-bis(3-methyl-4-aminophenyl)fluorene. The product obtained had an isocyanate equivalent weight of 242.6 (the theoretical is 199) and was confirmed by IR, $^1$H, and $^{13}$C NMR spectroscopy to be 9,9 bis-(4-isocyanatophenyl)fluorene. It was designated BAF/NCO.

EXAMPLE 1

A polyethylenically unsaturated cardo polyurethane was prepared according to the following procedure:

Into a 500 ml 3-neck roundbottom flask equipped with an overhead stirrer and reflux condenser under a dry air atmosphere were charged 15.9 (0.08 eq.) 9,9-bis(4-methylaminophenyl)fluorene (BMAF) prepared as in U.S. Pat. No. 4,684,678) having an amine equivalent weight of 188.8, 48.3 g (0.2 eq.) PUD-1 (see A above), 18.95 g (0.056 eq.) PUD-III (see L above), 35.8 g (0.11 eq.) PUD-II (see B above), 45 g (0.41 eq., theoretical isocyanate equivalent weight 111)isophorone diisocyanate (IPDI available from Huls) 120 g butyl acetate and 6 drops (1000 ppm) dibutyltin dilaurate. The reaction was heated to 90° C. and this temperature was held for 16 hrs. Infrared (IR) analysis of the reaction mixture showed the isocyanate peak at about 2265 cm$^{-1}$ to be less than 3% of the height of the longest peak in the IR transmission spectrum, 10 ml of n-propanol was added to quench the reaction.

Further analysis of the reaction mixture by IR and $^1$H NMR was consistent with the expected butyl acetate solution of a polyurethane having pendent fluorene, acrylic and stearic groups.

About 2 to 4 grams of the reaction mixture was coated onto a piece of 0.1 mm 10.2 cm×30.5 cm unprimed polyester at 0.152 to 0.178 mm wet thickness. The coating was dried at ambient conditions for 15 to 18 hr, then further dried by heating in a forced air oven at 50° C. for 1 hr. to provide a film of 0.051 to 0.076 mm thickness. The resulting film analyzed was by differential scanning colorimetry (DSC) to determined the glass transition temperature (Tg) of the polymer. The results are shown in Table I. A sample of the reaction mixture was analyzed by (GPC) using tetrahydrofuran as the eluent to determine the weight average molecular weight (Mw), the number average molecular weight (Mn), and the polydispersity index (Pi), where Pi=Mw/Mn. The results are shown in Table I.

EXAMPLE 2

The following polyethylenically-unsaturated cardo polyurethane was prepared according to the procedure for Example 1. In place of the components used in Example 1, 18.9 g (0.1 eq.) BMAF, 61.4 g (0.25 eq.) PUD-I, and 16.84 g (0.05 eq) PUD-III were reacted with 43.96 g (0.35 eq. isocyanate equivalent weight 126) bis(4-isocyanatocyclohexyl)methane (H$_{12}$ MDI, available from Mobay as Desmodur W) in 141.1 g butyl acetate in the presence of about 1000 ppm dibutyltin dilaurate. When infrared analysis of the reaction mixture indicated that the isocyanate peak at 2265 cm$^{-1}$ was less than 3% of the height of the largest peak in the IR spectrum, the reaction was quenched with 1-2% n-propanol. The Tg of the polymer was determined by DSC analysis and the Mw, Mn, and Pi of the polymer were obtained from GPC analysis. The results are set forth in Table I.

EXAMPLE 3

The following polyethylenically-unsaturated cardo polyurethane was prepared according to the procedure for Example 1. In place of the components used in Example 1, 42.8 g (0.2 eq.) 9,9-bis(3-chloro-4-aminophenyl)fluorene (CAF prepared as described in U.S. Pat. No. 4,684,678) and 147.4 (0.6 eq.) PUD-I were reacted with 87.92 g (0.70 eq.) H$_{12}$ MDI in 278 g butyl acetate in the presence of about 1000 ppm dibutyltin dilaurate. When infrared analysis of the reaction indicated that the isocyanate peak at 2265 cm$^{-1}$ was less than 3% of the height of the largest peak in the IR spectrum, the reaction was quenched with 1-2% n-propanol.

The Tg of the polymer was determined by DSC analysis and the Mw, Mn, and Pi of the polymer were obtained from GPC analysis. The results are set forth in Table I.

EXAMPLE 4

The following polyethylenically-unsaturated cardo polyurethane was prepared according to the procedure for Example 1. In place of the components used for Example 1, 42.8 g (0.2 eq.) CAF, 122.8 g (0.5 eq.) PUD-I, and 33.7 g (0.1 eq.) PUD-III were reacted with 87.92 g (0.7 eq. H$_{12}$ MDI in 287.2 g butyl acetate in the presence of about 1000 ppm dibutyltin dilaurate. When infrared analysis of the reaction mixture indicated that the height isocyanate peak at 2265 cm$^{-1}$ was less than 3% of the height of the largest peak in the IR spectrum, the reaction was quenched with 1-2% n-propanol. The Tg of the polymer was determined by DSC analysis and the Mw, Mn, and Pi of the polymer were obtained from GPC analysis. The results are set forth in Table I.

EXAMPLE 5

The following polyethylenically-unsaturated cardo polyurethane was prepared according to the procedure for Example 1. In place of the components used in Example 1, 42.8 g (0.2 eq.) CAF, 98.3 (0.4 eq) PUD-I and 67.4 g (0.2 eq.) PUD-III were reacted with 87.92 g (0.7 eq H$_{12}$ MDI in 296.4 g butyl acetate in the presence of about 1000 ppm dibutyltin dilaurate. When infrared analysis of the reaction mixture indicated that the isocyanate peak at 2265 cm$^{-1}$ was less than 3% of the height of the largest peak in the IR spectrum, the reaction was quenched with 1-2% n-propanol. The Tg of the polymer was determined by DSC analysis and the MW, Mn, and Pi of the polymer were obtained from GPC analysis. The results are set forth in Table I.

EXAMPLE 6

The following polyethylenically-unsaturated cardo polyurethane was prepared according to the procedure for Example 1. In place of the components used in Example 1, 15.15 g (0.5 eq.) FEP/A solids at 50.9% solids in butyl acetate (see preparation D above) was reacted with 24.0 g (0.19 eq.) H$_{12}$ MDI in a total of 84 g butyl acetate in the presence of about 1000 ppm dibutyltin dilaurate. When infrared analysis of the reaction mixture indicated that the isocyanate peak at 2265 cm$^{-1}$ was less than 3 of the height of the largest peak in the IR spectrum, the reaction was quenched with 1-2% n-propanol. The Tg of the polymer was determined by DSC analysis and the Mw, Mn, and Pi of the polymer were obtained from GPC analysis. The results are set forth in Table I.

EXAMPLE 7

The following polyethylenically-unsaturated cardo polyurethane was prepared according to the procedure for Example 1. In place of the components used for Example 1, 15.15 g (0.05 eq.) FEP/A solids at 50.9% solids in butyl acetate, and 36.84 g (0.15 eq) PUD-I were reacted with 24 g (0.19 eq.) H 2 MDI in a total of 78.6 g butyl acetate in the presence of about 1000 ppm dibutyltin dilaurate. When infrared analysis of the reaction mixture indicated that the isocyanate peak at 2265 cm$^{-1}$ was less than 3% of the height of the largest peak in the IR spectrum the reaction was quenched with 1-2% n-propanol. The Tg of the polymer was determined by DSC analysis and the Mw, Mn, and Pi of the polymer were obtained from GPC analysis. The results are set forth in Table I.

EXAMPLE 8

The following polyethylenically-unsaturated cardo polyurethane was prepared according to the procedure for Example 1. In place of the components used for Example 1, 48.0 g (0.15 eq.) FEP/A solids at 49.6% solids in butyl acetate, 24.6 g (0.10 eq.) PUD-I and 50.5 g (0.15 eq.) PUD-III were reacted with 43.96 g (0.35 eq.) H$_{12}$ MDI in a total of 167.9 g butyl acetate in the presence of about 1000 ppm dibutyltin dilaurate. When infrared analysis of the reaction mixture indicated that the isocyanate peak at 2265 cm$^{-1}$ was less than 3% of the height of the largest peak on the IR spectrum reaction was quenched with 1-2% n-propanol. The Mw, Mn, and Pi of the polymer were determined by GPC analysis. The results are set forth in Table I.

EXAMPLE 9

The following polyethylenically-unsaturated cardo polyurethane was prepared according to the procedure for Example 1. In place of the components used for Example 1, 15.46 g (0.05 eq.) PHP/OH (see preparation F above) and 36.84 g (0.15 eq.) PUD-I were reacted with 21.0 g (0.19 eq.) in 53.3 g butyl acetate and 20 g tetrahydrofuran in the presence of about 1000 ppm dibutyltin dilaurate. When infrared analysis of the reaction mixture indicated that the isocyanate peak at 2265 cm$^{-1}$ was less than 3% of the height of the largest peak in the IR spectrum the reaction was quenched with 1-2% n propanol. The Tg of the polymer was determined by DSC analysis and the Mw, Mn, and Pi of this polymer were obtained from GPC analysis. The results are set forth in Table I.

EXAMPLE 10

The following polyethylenically-unsaturated cardo polyurethane was prepared according to the procedure of Example 1.

In place of the components used for Example 1, 28.08 g (0.091 eq.) CEP/A solids at 57.5% solids in butyl acetate (see Preparation E above) was reacted with 9.5 g (0.086 eq.) IPDI in a total of 37.6 g butyl acetate in the presence of about 1000 ppm dibutyltin dilaurate. When infrared analysis of the reaction mixture indicated that the isocyanate peak at 2265 cm$^{-1}$ was less than 3% of the height of the largest peak in the IR spectrum, the reaction was quenched with 1-2% n-propanol. The Tg the polymer was determined by DSC analysis and the Mw, Mn, and Pi of the polymer were obtained from FPC analysis. The results are set forth in Table I.

EXAMPLE 11

The following polyethylenically-unsaturated cardo polyurethane was prepared according to the procedure for Example 1. In place of the components used for Example 1, 9.2 g (0.05 eq.) NOR/OH (see Preparation G above), and 12.25 g (0.05 eq.) PUD-I were reacted with 10.5 g (0.95 eq.) EPDI in 16 g butyl acetate and 16 g tetrahydrofuran in the presence of about 1000 ppm dibutyltin dilaurate. When infrared analysis of the reaction mixture indicated that the peak at 2265 cm$^{-1}$ was less than 3% of the of height the largest peak in the IR spectrum, the reaction was quenched with 1-2% n-butanol. The Tg of the polymer was determined by DSC analysis and the Mw, Mn, and Pi of the polymer were obtained by GPC analysis. The results are set for in Table I.

EXAMPLE 12

The following polyethylenically-unsaturated cardo polyurethane was prepared according to the procedure for Example 1. In place of the components used in Example 1, 10.2 g (0.05 eq.) IND/OH (see preparation H above) and 12.28 g (0.05 eq.) PUD-I were reacted with 10.5 g (0.095 eq.) IPDI in 16 g butyl acetate and 16 g tetrahydrofuran in the presence of about 1000 ppm dibutyltin dilaurate. When infrared analysis of the reaction mixture indicated that the isocyanate peak at 2265 cm$^{-1}$ was less than 3% of the height of the largest peak in the IR spectrum, the reaction was quenched with 1-2% n-butanol. The Tg of the polymer was determined by DSC analysis and the Mw, Mn, and Pi of the polymer were obtained by GPC analysis. The results are set forth in Table I.

EXAMPLE 13

The following polyethylenically-unsaturated cardo polyurethane was prepared according to the procedure of Example 1. In place of the components used for Example 1, 10.0 g (0.47 eq., 214.8 isocyanate equivalent weight) OTBAF/NCO (see Preparation I above) was predissolved in 40 g dimethylformamide and reacted with 25.15 g (0.1024 eq.) PUD-I along with 4.9 g (0.44 eq.) IPDI in the presence of about 1000 ppm dibutylin dilaurate. When infrared analysis of the reaction mixture indicated that the isocyanate peak at 2265 cm$^{-1}$ was less than 3% of the height of the largest peak in the IR spectrum, the reaction was quenched with 1-2% n-propanol. The Tg of the polymer was determined by DSC analysis and the Mw, Mn, and Pi of the polymer were obtained by GPC analysis. The results are set forth in Table I.

EXAMPLE 14

The following polyethylenically-unsaturated cardo polyurethane was prepared according to the procedure of Example 1. In place of the components used for Example 1, 11.8 g (0.05 eq., 235.5 isocyanate equivalent weight) CAF/NCO (see Preparation J above) was predissolved in 41.65 g dimethylformamide and reacted with 24.6 g (0.10 eq.) PUD-I along with 5.25 g (0.047 eq. IPDI in the presence of about 1000 ppm dibutyltin dilaurate. When infrared analysis of the reaction mixture indicated that the isocyanate peaks at 2265 cm$^{-1}$ was less that 3% of the height of the largest peak in the IR spectrum, the reaction was quenched with 1-2% butanol. The Tg of the polymer was determined by DSC analysis and the Mw, Mn, and Pi of the polymer were obtained by GPC analysis. The results are set forth in Table I.

EXAMPLE 15

The following polyethylenically-unsaturated cardo polyurethane was prepared according to the procedure for Example 1. In place of the components used for Example 1, 5 g (0.025 eq. 199 theoretical isocyanate equivalent weight) BAF/NCO (see preparation K above) was predissolved in 20 g dimethylformamide and reacted with 12.3 g (0.05 eq.) PUD-I along with 2.6 g (0.023 eq) IPDI in the presence of about 1000 ppm dibutyltin dilaurate. When infrared analysis of the reaction mixture indicated that the isocyanate peak at 2265 cm$^{-1}$ was less than 3% of the height of the largest peak in the IR spectrum, the reaction was quenched with 1-2% n-butanol. The Tg of the polymer was determined by DSC analysis and the Mw, Mn, and Pi of the polymer were obtained by GPC analysis. The results are set forth in Table I.

EXAMPLE 16

The following polyethylenically-unsaturated cardo cellulosic polyurethane was prepared according to the procedure for Example 1. In place of the components used for Example 1, 11.5 g CABTM 381-0.1 (cellulose acetate butyrate, containing 38% butyrate, 13% acetate and 1% hydroxyl groups by weight, and having a viscosity of 0.1 as determined by ASTM D-817, formula A, available from Eastman, 11.32 g (0.06 eq.) BMAF, 44.20 g (0.8 eq.) PUD-I and 27.62 g 10.08 eq). PUD-III were predissolved in 190 g butyl acetate and reacted with 32 g (0.29 eq.) IPDI in the presence of 1000 ppm dibutyltin dilaurate. When infrared analysis of the reaction mixture indicated that the isocyanate peak at 2265 cm$-1$ was less than 3% of the height of the largest peak in the IR spectrum, the reaction was quenched with 1-2% n-butanol. The Tg of the polymer was determined by DSC analysis and the Mw, Mn, and Pi of the polymer were obtained by GPC analysis. The results are set forth in Table I.

EXAMPLE 17

The following polyethylenically-unsaturated cardo polyurethane was prepared according to the procedure of Example 1. In place of the components used in Example 1, 1.73 g (0.025 eq.) di(2-mercaptoethyl)ether was pre-reacted for 45 min. at 85° C. with 19.0 g (0.171 eq.) IPDI in 10 g butyl acetate in the presence of 5 drops triethylamine. To this reaction was then added 4.72 g (0.028 eq.) BMAF, 36.84 g (0.15 eq) PUD-I, 52.3 g butyl acetate, and 1000 ppm dibutyltin dilaurate. When infrared analysis of the reaction mixture indicated that the isocyanate peak at 2265 cm$^{-1}$ was less than 3% of the height of the largest peak in the IR spectrum, the reaction was quenched with 1-2% n-butanol. The Tg of the polymer was determined by DSC and the Mw, Mn, and Pi of the polymer were obtained from GPC analysis. The results are set forth in Table I.

EXAMPLE 18

The following polyethylenically-unsaturated cardo polyurethane was prepared according to the procedure for Example 1. In place of the components used in Example 1, 1.96 g (0.025 eq.) trimethylene glycol di-p-amino-benzoate, 4.72 g (0.025 eq.) 9,9-bis(4-methylaminophenyl) fluorene, 36.85 g (0.15 eq.) PUD-I were reacted with 19.0 g (0.171 eq.) IPDI in 62.5 g butyl acetate in the presence of 1000 ppm dibutyltin dilaurate. When infrared analysis of the reaction mixture indicated that the isocyanate peak at 2265 cm$^{-1}$ was less than 3% of the height of the largest peak in the IR spectrum, the reaction was quenched with 1-2% n-butanol. The Tg of the polymer was determined by DSC and the Mw, Mn, and Pi of the polymer were obtained from GPC analysis. The results are set forth in Table I.

COMPARATIVE EXAMPLE C1

A non-cardo group containing polyethylenically-unsaturated polyurethane was prepared by charging a 500 ml roundbottom flask equipped with an overhead stirrer and reflux condenser under a dry air atmosphere with 86.5 g (0.35 eq.) PUD-I, 37.0 g (0.34 eq.) IPDI, 123.4 g butyl acetate and 1000 ppm dibutyltin dilaurate. The mixture was heated to 85° C. for 15.5 h at the end of which time infrared analysis of the reaction mixture showed an absence of isocyanate groups. The reaction was then quenched with 5 ml of n-butanol. The results are set forth in Table I. The Tg of the polymer was determined by DSC analysis.

COMPARATIVE EXAMPLE C2

The following non-cardo group containing polyethylenically unsaturated polyurethane was prepared according to the procedure for Comparative Example C1. In place of the components used for Example C1, 244.6 g (1.0 eq.) PUD-1, 140 g (0.14 eq. PPG TM 2025 poly(oxypropylene)diol, molecular weight about 2000, available from Union Carbide) were reacted with 137.1 g (1.09 eq.) H$_{12}$MDI in 522 g butyl acetate in the presence of 1000 ppm dibutyltin dilaurate. When infrared analysis indicated that the isocyanate peak at 2265 cm$^{-1}$ was less than 3% of the height of the largest peak in the IR spectrum, the reaction was quenched with 1-2% n-propanol of the polymer was determined by DSC analysis and the Mw, Mn, and Pi of the polymer were obtained by GPC analysis. The results are set forth in Table I.

TABLE I

| Example | Mw | Mn | Pi | Tg (°C.) |
|---|---|---|---|---|
| 1 | 20,400 | 7,630 | 2.67 | 45-65 |
| 2 | 13,600 | 5,940 | 2.29 | 52-66 |
| 3 | 24,200 | 8,820 | 2.74 | 53-74 |
| 4 | 18,300 | 7,420 | 2.47 | 50-73 |
| 5 | 19,900 | 8,220 | 2.42 | 48-73 |
| 6 | 20,900 | 8,410 | 2.49 | 47-73 |
| 7 | 24,200 | 8,230 | 2.94 | 53-74 |
| 8 | 14,200 | 6,820 | 2.08 | — |
| 9 | 35,100 | 9,050 | 3.88 | 44-64 |
| 10 | 14,600 | 5,280 | 2.77 | 60-78 |
| 11 | 23,000 | 7,430 | 3.10 | 42-64 |
| 12 | 23,000 | 7,300 | 3.15 | 44.72 |
| 13 | 15,700 | 5,710 | 2.75 | 38-62 |
| 14 | 12,600 | 4,800 | 2.62 | 38-58 |
| 15 | 6,140 | 2,370 | 2.60 | 20-52 |
| 16 | 16,300 | 4,510 | 2.62 | 40-66 |
| 17 | 12,100 | 5,160 | 2.3 | 24-56 |
| 18 | 30,000 | 9,420 | 3.19 | 20-57 |

TABLE I-continued

| Example | Mw | Mn | Pi | Tg (°C.) |
|---|---|---|---|---|
| C1 | — | — | — | 34–48 |
| C2 | 36,500 | 14,400 | 2.5 | −14–42 |

The following performance evaluations were run on selected polyethylenically-unsaturated cardo polyurethanes and the non-cardo group containing polyethylenically-unsaturated polyurethanes. In these performance evaluations each coating is identified by the example number or comparative example number corresponding to the preparation of cardo monomer containing (examples of the invention) or non-cardo monomer containing polyurethane (comparative examples C1 and C2). The performance of a nitrocellulose lacquer (20 sheen lacquer, part 4120-5-1245A available from Reliance Universal, Inc.) was also evaluated and is identified as coating composition C3.

Coating solutions were prepared by diluting each polyurethane reaction product such that a coating solution resulted containing 20% solids, 40% butyl acetate, 20% propyl acetate, and 20% n-propanol. About 4 weight percent photoinitiator (Irgacure TM 184 available from Ciba-Geigy Corp.), based on the weight of the solids, was added to each coating solution.

Wood substrates were prepared by sanding 30 cm × 30 cm oak panels with 320 grit sandpaper, spraying the sanded wood with a 10% 1:1 n-butyl acetate: n-butanol-solution of an acid-catalyzed urea-formaldehyde wash coat allowing the coating to dry, rubbing the dried wash coat with linseed oil filler, applying a 18% solids 2:1:1 n-butyl acetate: n-propyl acetate: n-propanol acid-catalyzed urea-formaldehyde sealer coat, drying the sealer coat, and sanding with 320 grit zinc stearate-treated sandpaper.

The coating solutions were spray coated onto the prepared wood substrates in three applications, allowing 20 minutes for air drying between each coat to provide coating thicknesses of 75 to 100 microns. After the final coat, the coated substrates were air dried as described below.

The dried coatings were visually evaluated for drydown character, e.g., coating evenness, presence of bubbles, etc. Of the polymers evaluated as wood coatings, all dried down well. After air drying at about 25° C. for about 20 hours, the coated substrates were sanded with 400 grit sandpaper; sanded with 600 grit sandpaper, rubbed with T-type Scotchbrite TM cleaning and polishing pad, available from 3M, and polished with Prep Team TM, a super heavy duty rubbing compound available from 3M.

The coatings were qualitatively rated for sandability and polishability. Coatings have excellent ability do not load or gum the sandpaper, while coatings having poor sandability rapidly load or gum the sandpaper. Coatings having excellent polishability are mirror flat by visual inspection and provide sharp reflected images, while coatings having poor polishability give poorly defined reflected images upon visual inspection. The inclusion of cardo groups the polyurethanes is important in imparting rubbability (sandability and polishability) to the coating. The examples containing cardo groups have good rubbability while Comparative Examples C1 and C2, loaded the sandpaper in sanding and gave poorly defined reflected images after polishing. Comparative Example C3, the nitrocellulose lacquer exhibited excellent rubbability.

The thus-prepared coatings were cured by exposure to ultraviolet light at a total dose of about 2 joules/cm$^2$ by passing the prepared coated panel through a U.V. Processor, Model QC-1202 N/A, available from Radiation Polymer Co., at a belt speed of 32 cm/min under two 300 watt/cm medium pressure mercury lamps set at a distance of about 8 cm above the surface of the coating.

Solvent and stain resistance of the coatings were evaluated on horizontal cured panels. The solvents and staining materials tested included acetone (S1), finger nail polish remover (S2), 50/50 ethanol/water (S3) 70/30 isopropanol/water (S4), Kiwi brown shoe polish (S5), Merthiolate TM (S6), 10% aqueous trisodium phosphate (S7), and 5% citric acid (S8).

Cotton balls, two for each reagent, were placed at random locations on each test panel. The cotton balls were then thoroughly saturated with reagent and covered with a jar lid. At half-hour intervals, the jar lids were removed from the acetone and finger nail polish remover test sites and the coating performance was evaluated. The remaining solvents and staining agents were left undisturbed for 8 hours. At the end of that time all the covers and cotton balls were removed and all test sites wiped with a damp cloth followed by wiping with a clean dry cloth. The test panels were then conditioned for 16 to 24 hours at about 25° C. and rated on a scale of 1 to 5 as follows:

5—no visible change (no damage);

4—slight change in luster, visible only when the light source is mirrored in the test surface on or near the mark and is reflected towards the observer's eye, or 3—slight mark, visible in several viewing directions, e.g., almost entire exposed area just visible, or few isolated blisters in the wood grain only;

2—strong mark with the structure of the surface being largely unchanged, or blistering or delamination in the wood grain; and 1—strong mark with the structure of the surface being changed, or the surface material being at least partially removed or delaminated, or the cotton ball adhering to the surface.

Note: if the two initial rating values for a given solvent were within at least 1 rating point of each other, the ratings are averaged and the average reported. If the difference between the two initial rating values was greater than 1, three additional test sites were tested, high and low rating values of the five tests were deleted, and the remaining three rating values averaged.

Preferably the solvent and stain resistance values are at least 2, more preferably at least 4. The solvent and stain resistance results are set forth in Table II.

Uncrosslinked coatings such as comparative Example C3 have uniformly poor solvent and stain resistance, while the crosslinked coatings exhibit better protective properties.

TABLE II

| Coating | Solvent or Staining Materials | | | | | | | |
|---|---|---|---|---|---|---|---|---|
| | S1 | S2 | S3 | S4 | S5 | S6 | S7 | S8 |
| 1 | 1 | 1 | 5 | 5 | 3 | 5 | 5 | 3 |
| 2 | 5 | 5 | 5 | 5 | 5 | 5 | 5 | — |
| 3 | 3 | 3 | 5 | 5 | 5 | 4 | 5 | 2 |
| 4 | 4 | 5 | 5 | 5 | 5 | 5 | 5 | 5 |
| 5 | 3 | 1 | 5 | 5 | 5 | 4 | 5 | 4 |
| 6 | 5 | 5 | 5 | 5 | 5 | 5 | — | — |
| 7 | 3 | 3 | 5 | 5 | 5 | 5 | 5 | 2 |
| 8 | 3 | 4 | — | — | — | — | — | — |

TABLE II-continued

| Coating | Solvent or Staining Materials | | | | | | | |
|---|---|---|---|---|---|---|---|---|
| | S1 | S2 | S3 | S4 | S5 | S6 | S7 | S8 |
| 16 | 1 | 1 | 5 | 5 | 5 | 5 | 5 | 4 |
| C1 | 5 | 5 | 5 | 5 | 5 | 5 | 5 | — |
| C2 | 1 | 1 | 5 | 5 | 2 | 3 | 5 | — |
| C3 | 1 | 1 | 1 | 4 | 1 | 1 | 4 | 3 |

The panels having the cured coatings thereon were also evaluated for dry hot print resistance (DHP) and wet hot print resistance (WHP). Dry hot print resistance was determined by placing a 5-pound weight, heated to 100° C., on 2 thicknesses of 80 grade cheese cloth in direct contact with the cured coating. After 30 minutes, the weight is removed, the surface wiped with a soft cloth, and the panel is conditioned for 16 to 20 hours at about 25° C. and rated. Wet hot print resistance was determined by the same procedure as is used for dry hot print resistance except the cheese cloth is saturated with distilled water prior to placing weight on it. The panels are evaluated using the same ratings as for solvent and stain resistance. Preferably the dry hot print resistance and the wet hot print resistance are at least 2, more preferably at least 4. The results are set forth in Table III.

TABLE III

| Coating | DHP | WHP | CCR | AR |
|---|---|---|---|---|
| 1 | 5 | 5 | #20+ | 14.1 |
| 2 | 5 | 5 | 20 | 15.7 |
| 3 | 5 | 5 | 13 | 11.4 |
| 4 | 5 | 6 | 20+ | 13.5 |
| 5 | 5 | — | 20+ | 16.5 |
| 6 | — | — | 1 | 9.2 |
| 7 | — | — | 13 | 11.4 |
| 8 | — | — | 20+ | 15.0 |
| 16 | 5 | 5 | 20+ | 19.0 |
| C1 | 5 | 4 | 2 | 14.3 |
| C2 | 5 | 3 | 6 | 6.8 |
| C3 | 1 | 1 | 20+ | 50.0 |

The panels having the cured coatings thereon were further evaluated for cold check resistance (CCR), i.e., whiting. Cold check resistance was determined by cycling the panels through (1) one hour at 50° C. in a forced air oven, (2) one hour at −23° C. in a freezer, and (3) 30 minutes at 25° C. and examining the panel for whiting after each cycle with a maximum of 20 cycles being run on each panel.

Preferably, the panels survive at least 10 cycles without whiting, more preferably at least 20 cycles without whiting. The number of cycles required to produce whiting is reported in Table III. The inclusion of long chain aliphatic group modified diols aids in the prevention of whiting of the coatings. Examples 3, 6, 7, C1 and C2, with no PUD-III each turn white in 13, 1, 13, 2 and 6 cycles respectively. The remainder of the Examples all withstand 20 cycles without turning white.

Abrasion resistance (AR) of the coatings produced by each coating solution was determined by spreading about 6 g of the prepared coating solution onto a 10 cm×60 cm sheet of photograde polyester film using a #55 wire wound rod. The coatings were dried overnight at about 25° C. in a dust free environment and cured under ultraviolet light at a total dose of about 2 joules/cm2 by passing the prepared coated panel through a Processor, Model QC-1202 N/A, available from Radiation Polymer Co., at a belt speed of 32 cm/min under two 300 watt/cm medium pressure mercury lamps set at a distance of about 8 cm above the surface of the coating. Discs having a diameter of 10 cm were cut from the sheets of film and abraded on a Taber TM Abraser, available from Gardner/Neotec Division of Pacific Scientific, using a CS-17 abrasive wheel with a 500 g load for 30 cycles. The abrasion resistance is determined by measuring the haze value of the abraded film with a Gardner TM Hazemeter Model No. XL-211, available from Gardner/Neotec Co. The lower the haze value, the greater is the abrasion resistance of the coating. Preferably, the haze value is 25 or lower, more preferably 20 or lower. The abrasion resistance is reported in Table III. Examples 9–18 were not rated for abrasion resistance, but these cured coatings showed resistance to 200 rubs with a cotton swab saturated with methyl ethyl ketone. It can be noted that the inclusion of long chain aliphatic group modified diols slightly lowers the abrasion resistance of these materials. For instance, Example 3, 4, and 5 which constitute a series which contains increasing amounts of these diols, the haze readings are respectively 11.4, 13.5, and 16.5. The uncrosslinked coating C3 has the worst abrasion resistance.

EXAMPLE 19

The reaction product of Example 12 was coated onto polyester film at about 0.2 mm wet thickness and allowed to dry at 22° C. overnight. The dried polymer was scraped from the film and ground to a powder. A disk was prepared from this powder by pouring the about 1.5 g of the powder into a 20 mm diameter annular Teflon TM die standing on end of a Teflon TM platen compressing the powder by placing a U.S. one-cent piece, i.e., a penny, on the powder, and heating the powder-filled die for 2.5 hours at 90° C. After cooling, the resulting disk which was amber in color, 4 mm thick and 20 mm diameter, was removed from the die. The disk could be filed with a metal file, and the filings were soluble in THF or MEK.

A second disk was prepared as described above except that after heating for 2.5 hours at 90° C., the disk was further heated at 150° C. overnight prior to removal from the die. The resultant disk which retained the image of the penny, was insoluble in tetrahydrofuran and methyl ethyl ketone, indicating that the polymer has cured, i.e., crosslinked, during heating at 150° C.

Various modifications and alterations of this invention will become apparent to those skilled in the art without departing from the scope and spirit of this invention.

I claim:

1. An uncured polyethylenically-unsaturated polyurethane polymer with pendant cyclic groups, said polyurethane polymer having the general formula

wherein:
 each $R^d$ is independently one or more divalent organic groups selected from divalent groups that are residues provided by the removal of two of hydroxyl, thiol, and amino groups from aliphatic, and cycloaliphatic diols and dithiols and aliphatic, cycloaliphatic and aromatic diamines having a molecular weight of up to about 100,000 or more;

each $R^i$ is independently one or more divalent organic groups that are the residue provided by removal of two NCO groups from an organic diisocyanate;

each X is independently —O—, —S—, or —NR— wherein R is hydrogen or lower alkyl having 1 to 6 carbon atoms; and a is a number having a value such that the polyurethane will form a continuous film;

with the proviso that $R^d$ comprises the residue of an amount of ethylenically-unsaturated diol such that the polyurethane can be crosslinked to an organic solvent-insoluble state and that at least one percent by weight of diols, diamines, dithiols and diisocyanates are substituted with pendant cyclic groups.

2. The polyurethane polymer of claim 1 wherein $R^d$ comprises the residue of at least 5 percent by weight of ethylenically-unsaturated diol.

3. The polyurethane polymer of claim 1 in which up to 25 mole percent of the $R^d$ and $R^i$ groups are substituted by long chain aliphatic groups.

4. The polyurethane polymer of claim 1 in which the diols are ethylenically-unsaturated diols that are the reaction product of ethylenically-unsaturated acids, alcohols, or phenols with polyepoxides.

5. The polyurethane polymer of claim 1 wherein $R^d$

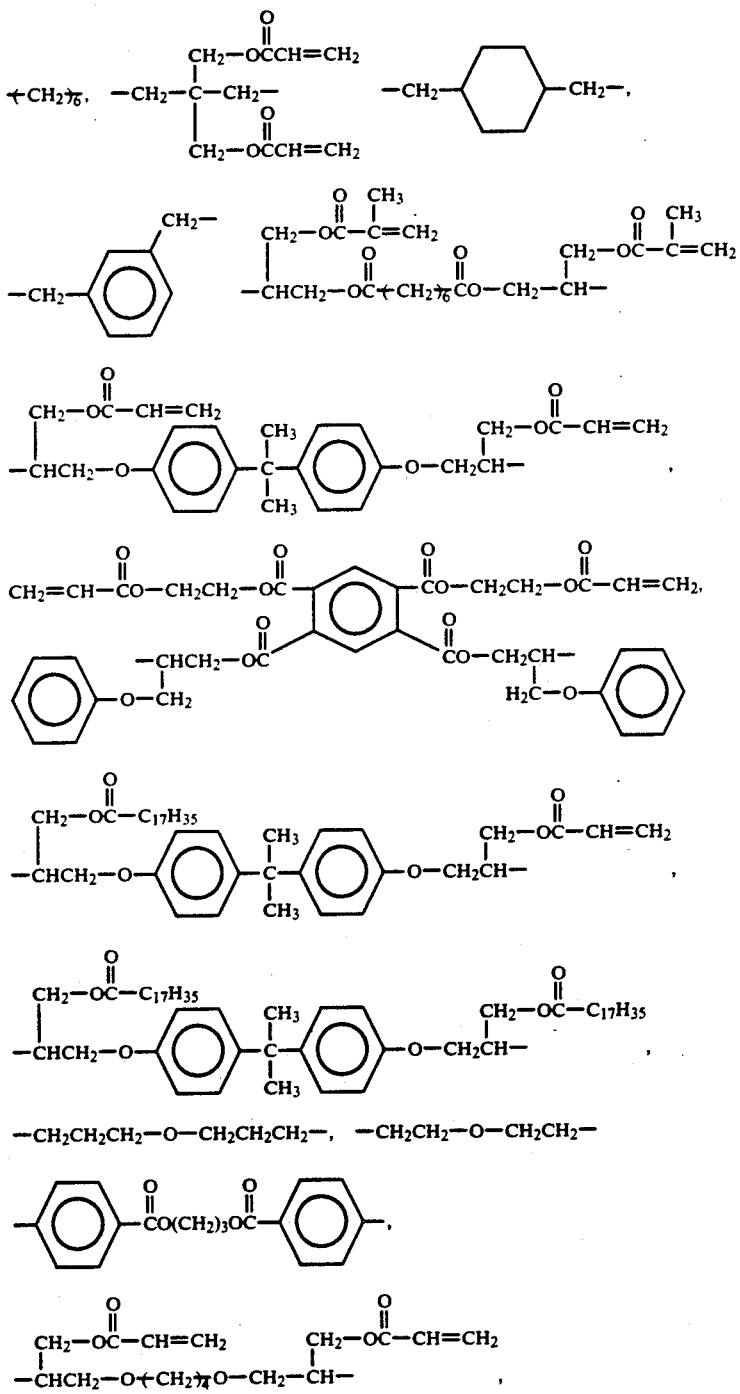

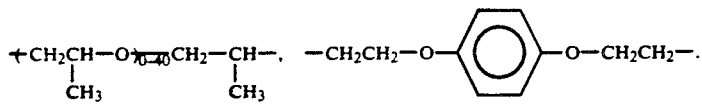

6. The polyurethane polymer of claim 1 wherein said $R^i$ groups are derived from isocyanates selected from the group of diisocyanates consisting of 9,9-bis(3-methyl-4-isocyanatophenyl)fluorene, 9,9-bis(3-chloro-4-isocyanatophenyl)fluorene and 9,9-bis(4-isocyanatophenyl)fluorene.

7. The polyurethane polymer of claim 1 wherein said $R^d$ groups are derived from diols that are the reaction product of an ethylenically-unsaturated carboxylic acid and a diglycidyl ether or ester of a bisphenol or a hydrogenated bisphenol.

8. The polyurethane polymer of claim 1 wherein said $R^d$ groups are derived from the adduct of acrylic acid and the diglycidyl ether of bisphenol A or a hydrogenated bisphenol.

9. The polyurethane polymer of claim 1 wherein said $R^d$ groups are derived from diols that are the reaction product of a mixture of ethylenically-unsaturated carboxylic acids and saturated aliphatic carboxylic acids and a diglycidyl ether or ester of a bisphenol or hydrogenated bisphenol.

10. The polyurethane polymer of claim 9 wherein said ethylenically-unsaturated carboxylic acid is acrylic acid and said diglycidyl ether is the diglycidyl ether of bisphenol A.

11. The polyurethane polymer of claim 9 wherein said ethylenically unsaturated acid is acrylic acid and said diglycidyl ether is the diglycidyl ether of 9,9-bis(4-hydroxy phenyl) fluorene.

12. The polyurethane polymer of claim 10 wherein said saturated aliphatic acid is stearic acid.

13. The polyurethane polymer of claim 1 wherein said $R^i$ is derived from isophorene diisocyanate.

14. A coating composition comprising the polymers of claim 1.

15. A substrate bearing a cured layer of the coating composition of claim 14.

16. A polyurethane polymer of claim 1 wherein said $R^d$ groups are derived from diols selected from the group of diols consisting of
9,9-bis-[4-(2-hydroxyethoxyphenyl)]fluorene;
2,2-bis-[4-(2-hydroxyethoxyphenyl)]norbornane;
2,2-bis-4-[(2-hydroxyethoxyphenyl)]-5,6-cyclopentanorbornane;
1,1-bis-[4-(2-hydroxyethoxyphenyl)]cyclohexane;
9,9-bis-[4-(N-methyl,N-2-hydroxyethylamino phenyl)]fluorene;
9,9-bis[4-(3-acryloyloxy-2-hydroxypropoxy)phenyl]fluorene;
1,1-bis[3,5-dimethyl-4-(3-acryloyloxy-2-hydroxypropoxy)phenyl]cyclohexane.

* * * * *